United States Patent
Ansell et al.

(10) Patent No.: US 6,792,113 B1
(45) Date of Patent: Sep. 14, 2004

(54) ADAPTABLE SECURITY MECHANISM FOR PREVENTING UNAUTHORIZED ACCESS OF DIGITAL DATA

(75) Inventors: Steven T. Ansell, Fremont, CA (US); Andrew R. Cherenson, Los Altos, CA (US); Leon Rishniw, San Francisco, CA (US); Susan A. Cannon, San Jose, CA (US); Edward J. Allard, San Francisco, CA (US); Jason S. Brownell, San Francisco, CA (US); Micah Stroud, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/468,279

(22) Filed: Dec. 20, 1999

(51) Int. Cl.[7] .................................. H04L 9/14
(52) U.S. Cl. ........................... 380/284; 705/57
(58) Field of Search ........................ 380/284, 281, 380/273, 262; 705/51, 57, 56; 713/182, 179, 183, 202, 184

(56) References Cited

U.S. PATENT DOCUMENTS

| | | | |
|---|---|---|---|
| 4,757,534 A | 7/1988 | Matyas et al. | 380/25 |
| 5,418,713 A | 5/1995 | Allen | 395/200.6 |
| 5,636,276 A | 6/1997 | Brugger | 380/4 |
| 5,677,952 A | 10/1997 | Blakely, III et al. | 380/4 |
| 5,794,217 A | 8/1998 | Allen | 395/610 |
| 5,892,900 A | 4/1999 | Ginter et al. | 395/186 |
| 5,898,777 A | 4/1999 | Tycksen, Jr. et al. | 380/4 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,943,422 A | 8/1999 | Van Wie et al. | 380/9 |
| 5,949,876 A | 9/1999 | Ginter et al. | 380/4 |
| 5,982,891 A | 11/1999 | Ginter et al. | 380/4 |
| 5,982,892 A | 11/1999 | Hicks et al. | 380/4 |
| 6,385,596 B1 * | 5/2002 | Wiser et al. | 705/51 |
| 6,434,535 B1 * | 8/2002 | Kupka et al. | 705/24 |

FOREIGN PATENT DOCUMENTS

| | | | |
|---|---|---|---|
| EP | 0766165 A2 | 2/1997 | G06F/1/00 |
| WO | WO 97/43761 | 11/1997 | G11B/20/00 |
| WO | WO 98/09209 | 3/1998 | G06F/1/00 |
| WO | WO 98/10381 | 3/1998 | G07F/7/00 |
| WO | WO 98/37481 | 8/1998 | G06F/1/00 |
| WO | WO 98/42098 | 9/1998 | H04L/9/00 |
| WO | WO 99/24928 | 5/1999 | G06F/1/00 |
| WO | WO 99/48296 | 9/1999 | H04N/7/167 |

* cited by examiner

*Primary Examiner*—Matthew Smithers
*Assistant Examiner*—Andrew Nalven
(74) *Attorney, Agent, or Firm*—Klarquist, Sparkman, LLP

(57) ABSTRACT

Content such as computer software, data representing audio-visual works, and electronic documents can converted from a machine-bound state to user-bound state without modification to the content data itself. Instead, keys used to access the content are converted from the machine-bound state to the user-bound state. In particular, the keys are kept in a passport data structure which can represent either a machine-binding or a user-binding. A machine-bound passport can be upgraded to a user-bound passport without modifying the bound content. The private key of the machine-bound passport, in cleartext form, is included in the user-bound passport and encrypted using a user-supplied password to bind the private key to the user. In addition, private user information is collected and verified and included in the user-bound passport. Upgrading a machine-bound passport can be initiated automatically upon detection that an attempt is made to play back machine-bound content on a machine other than the one to which the content is bound.

9 Claims, 26 Drawing Sheets

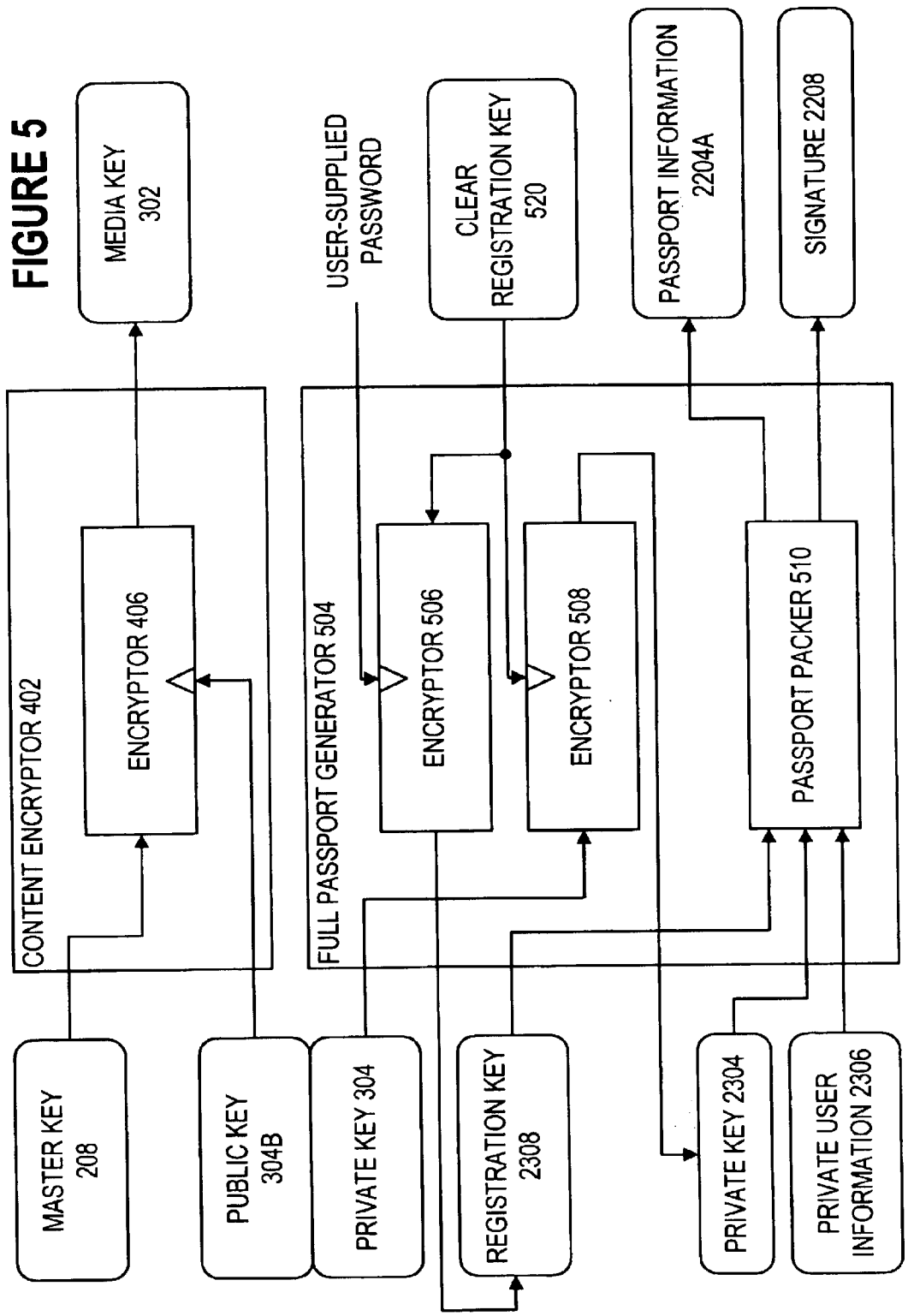

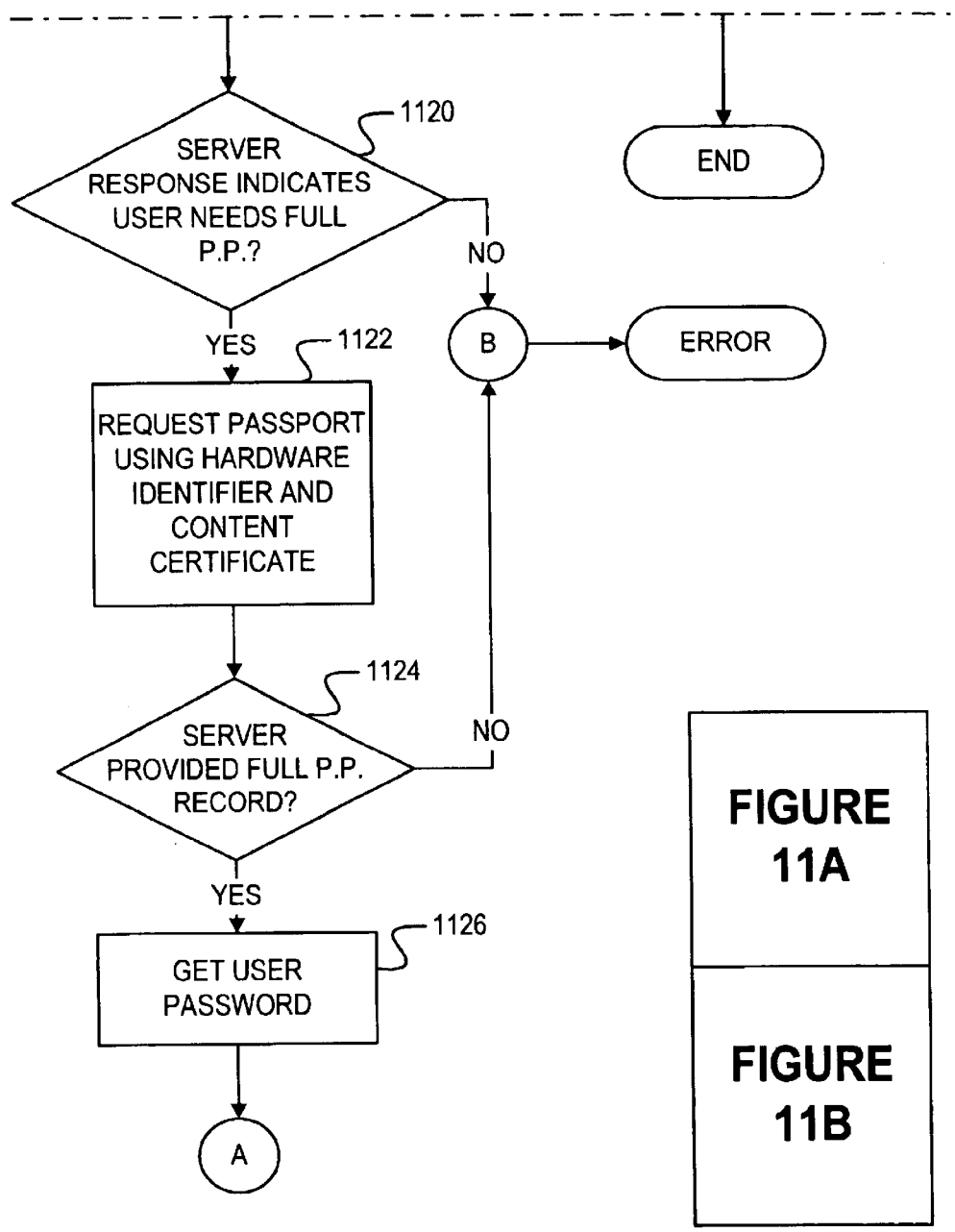
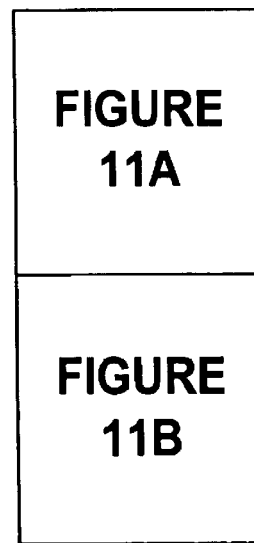
FIGURE 11B
FIGURE 11

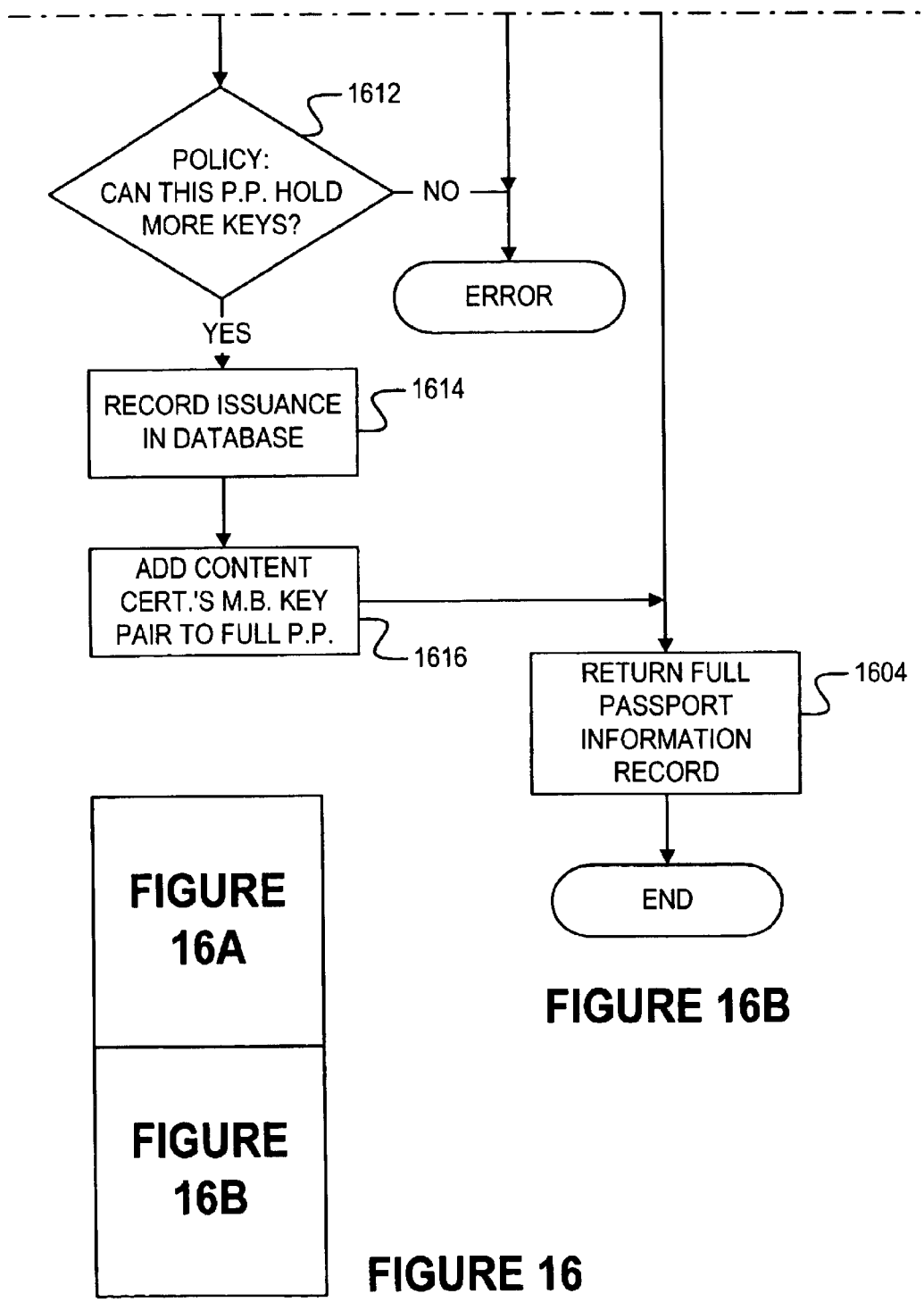

KEY RECORD 1704
- SERIAL NUMBER 1902
- PRIVATE KEY 1904
- PUBLIC KEY 1906
- VALIDITY DATES 1908
- REISSUE LIMIT 1910
- PASSPORT KEY LIMIT 1912
- HARDWARE IDENTIFIER 1914

FIGURE 19

ACCOUNT 1702
- SERIAL NUMBER 1802
- NAME 1804
- E-MAIL ADDRESS 1806
- COUNTRY 1808
- QUESTION 1810
- ANSWER 1812
- STATUS 1814
- TYPE 1816

FIGURE 18

ADAPTABLE SECURITY MECHANISM FOR PREVENTING UNAUTHORIZED ACCESS OF DIGITAL DATA

FIELD OF THE INVENTION

The present invention relates to systems for restricting unauthorized access to digital data and, in particular, to a mechanism for limiting access to such digital data to either a particular machine or a particular user and to a mechanism for converting limited access from a particular machine to a particular user.

BACKGROUND OF THE INVENTION

Protection of digital data from unauthorized access has been a primary concern of software vendors from the time software vendors first began delivering computer software on portable data storage media. Such protection has taken on new significance since other forms of digital data are now also transported on portable data storage media. For example, current personal computers read and write data storage media that is also used for ubiquitous audiovisual entertainment such as audio compact discs (CDs) and digital video discs (DVDs). Thus, common personal computers are capable of replicating very valuable data such that exact copies of the original data can easily be distributed to acquaintances.

One recent development has greatly expanded the threat to commercial value of easily copyable digital data: the Internet. Now, individuals can, and frequently do, post valuable digital data for free copying by millions of people. Such posting represents a catastrophic failure of any attempts to prevent unauthorized copying.

One early attempt at preventing unauthorized copying of software was to require a hardware device to be attached to a computer for the software to execute. Such devices were commonly referred to as "dongles." A dongle either included identification data checked by the software prior to execution or included encryption data and/or logic to decrypt software prior to execution. Dongles were typically externally attachable such that software could be transferred to another computer by attaching the dongle to the other computer.

Dongles never realized much success in the marketplace. One reason is that multiple software products can be installed in each computer. As a result, many dongles would have to be attached to each computer. Another reason is that adding a new hardware device to a computer could have unintended results, interfering with the normal operation of the computer. A third reason is that many people have multiple computers and moving one of multiple dongles from one computer to another on a regular basis was a significant inconvenience. In general, users preferred not to attach new hardware to their computers to run software if a competing software vendor did not require such additional hardware.

Machine binding, for example, by use of dongles, is generally unacceptable to people purchasing audiovisual content rather than computer software. Perhaps as a result of the portable nature of historical distribution media of audiovisual content (e.g., vinyl albums, audio CDs, video tape, DVDs, etc.), the consuming public seems to expect that audiovisual content is permitted to be played on any devices owned by the purchaser. For example, a purchaser of a video cassette tape of a particular movie expects to be able to view the movie on any video cassette player of a compatible format. Thus, strict machine binding of audiovisual content is generally unacceptable by the consuming public.

Another mechanism by which software vendors attempt to thwart unauthorized copying of software is binding the software to a specific user. For example, successful execution of the software can be made contingent upon entering a password by the specific user. Such generally provides insufficient security since the user can communicate the password to a friend or associate along with an unauthorized copy of the software. In addition, requiring a user to remember passwords for each software product and/or each audiovisual work accessed by the user represents a considerable inconvenience to the user.

In general, it should be remembered that copy protection benefits the vendor of digital data, e.g., software and/or audiovisual works, and does not benefit the purchaser. Accordingly, purchasers of such digital data have a relatively low tolerance for inconvenience. As a result, the consuming public tends to purchase data from vendors employing less copy protection.

What is needed is a mechanism by which copyrightable content of digital storage media is protected against unauthorized copying while affording the owner of such digital storage reasonable unimpeded convenience of use and enjoyment of the content.

SUMMARY OF THE INVENTION

In accordance with the present invention, content can converted from a machine-bound state to user-bound state without modification to the data itself. Instead, keys used to access the content are converted from the machine-bound state to the user-bound state. In particular, the keys are kept in a passport data structure which can represent either a machine-binding or a user-binding.

In the machine-binding, the passport contains a private key and a certificate that includes a public key which is the reciprocal of the private key. The private key is encrypted using a hardware identifier specific to the computer system to which the passport is bound. The hardware identifier is specific to one or more hardware devices and is preferably unique with respect to computer systems capable of accessing the content intended to be bound. The public key is used to encrypt a master key with which the content is encrypted and to create therefrom a media key which is included with the content along with the certificate of the machine-bound passport. As a result, the private key is required to decrypt the media and to recover the master key and therefore to decrypt the content. By encrypting the private key with the hardware identifier of a particular computer system, the content is effectively bound to that computer system since the hardware identifier of that computer is required to recover the master key.

In user-binding, the passport also contains a private key and a certificate that includes a public key which is the reciprocal of the private key. The user-bound passport secures the private key in largely the same manner as does a machine-bound passport except that the user-bound passport encrypts the private key with a user-supplied password. Accordingly, the password is required to decrypt the private key which in turn is required to decrypt the master key from the media key, and the master key is required to decrypt the content. By requiring the password, the content is bound to the user in possession of the password.

Since copy protection benefits the owner of copyrights and inconveniences the consumer of copyrighted works, a disincentive to sharing one's password is included in the user-bound passport. Specifically, the user-bound passport includes information which is expected to be carefully guarded by the user. For example, the user-passport can include credit card information of the user sufficient to charge funds to the credit card, e.g., credit card number, expiration, and cardholder name. A billing address can also be included. During playback of content, the private user information is displayed. Therefore, sharing one's passport includes sharing one's credit.

The user is provided with the option to have either a machine-bound passport or a user-bound passport. The machine-bound passport is more limited since content can only be played back on a specific machine. Such would be suitable for a person having access to only a single computer or to a person who is generally unsure of the entire process of purchasing copyrighted works through a computer network. The user-bound passport is less limited and can be moved from computer system to computer system. However, the user-bound passport requires that the user provide more sensitive, private information. It is expected that new users will opt for the machine-bound passport and will later wish to upgrade to the user-bound passport. Such can be required, for example, if the user sells or modifies the computer system to which the content is already bound.

A machine-bound passport can be upgraded to a user-bound passport without modifying the bound content. In particular, the original private and public keys of the machine-bound passport are used in a newly created user-passport such that re-encryption of the content is not required. Specifically, the private key of the machine-bound passport, in cleartext form, is included in the user-bound passport and encrypted using a user-supplied password to bind the private key to the user. In addition, private user information is collected and verified and included in the user-bound passport. Thus, the user-supplied password decrypts the private key to provide the same cleartext private key that results from decrypting the private key of the machine-bound passport using the hardware identifier. Accordingly, the previously machine-bound content can now be decrypted using the user-bound passport. In addition, since the user-bound passport is not bound to any particular hardware identifier, the content and the user-bound passport can be moved from computer system to computer system and can be played back with only the effort required to enter the user's password and to view the user's private information.

In addition, upgrading a machine-bound passport can be initiated automatically upon detection that an attempt is made to play back machine-bound content on a machine other than the one to which the content is bound.

On occasion, a user might have multiple passports. Some content may have been bound to a machine-bound passport and other content may have been subsequently bound to a user-bound passport. Upgrading of the machine-bound content involves adding the previously machine-bound keys to the user-bound passport such that the passport now contains multiple sets of keys. As a result, the same passport can be used to play back content acquired under two separate passports.

BRIEF DESCRIPTION OF THE DRAWINGS

FIG. 5 is a block diagram of a full, portable passport generator in accordance with the present invention.

FIG. 18 is a block diagram showing the account record of FIG. 17 in greater detail.

FIG. 19 is a block diagram showing the key record of FIG. 17 in greater detail.

DETAILED DESCRIPTION

Figure 1:
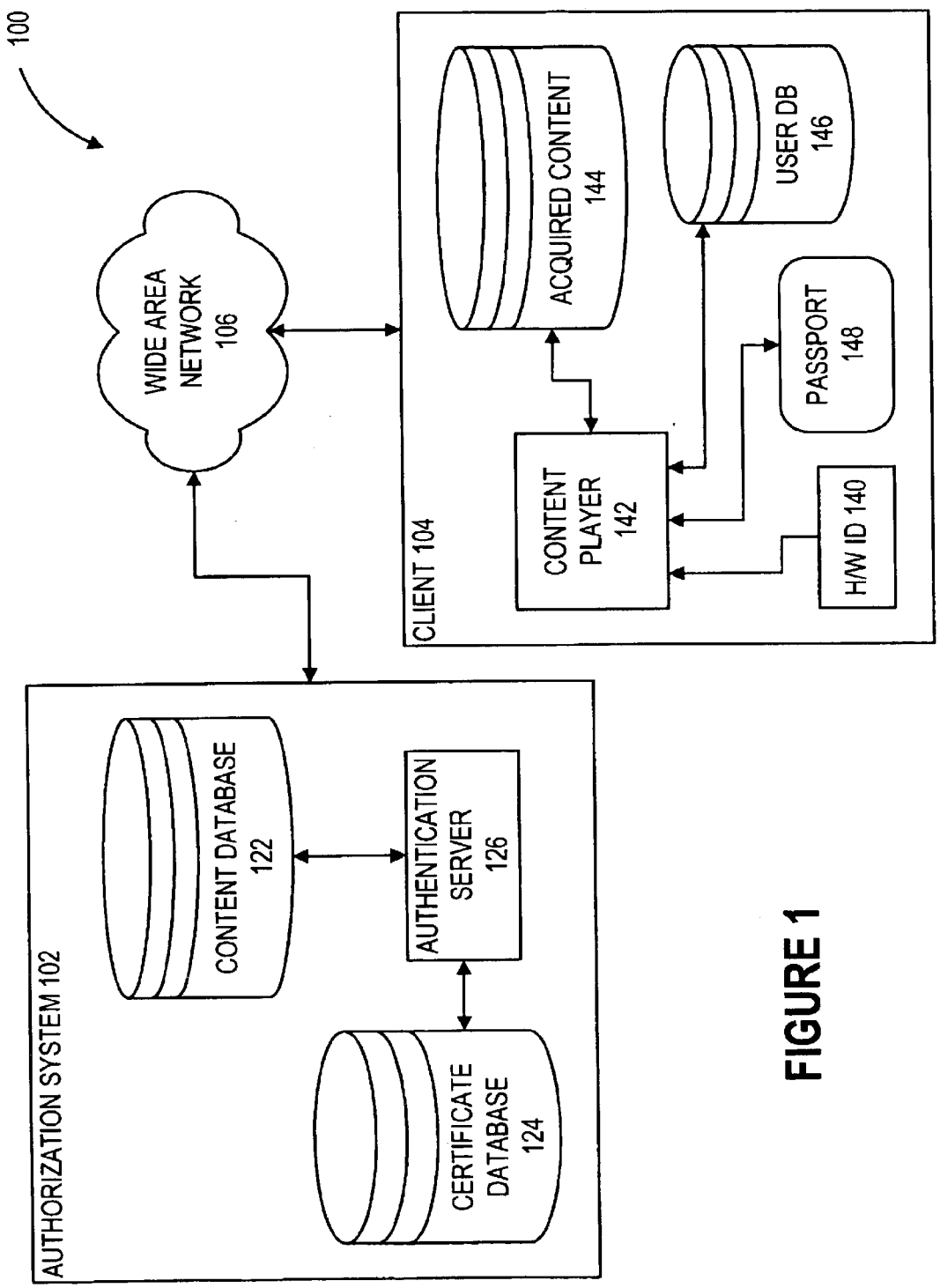
FIG. 1 is a block diagram of a computer system that includes a server computer system coupled to a client computer system through a wide-area computer network. The client computer system includes a content player that in turn access data that is secured in accordance with the present invention.

In accordance with the present invention, content can converted from a machine-bound state to user-bound state without modification to the data itself. Instead, keys used to access the content are converted from the machine-bound state to the user-bound state. In particular, the keys are kept in a passport data structure which can represent either a machine-binding or a user-binding.

Digital data delivery system 100 (FIG. 1) includes an authorization system 102 and a client computer system 104 which are coupled to one another through a wide-area computer network 106. In one embodiment, wide-area computer network 106 is the Internet. While a wide-area network 106 is shown, it is appreciated that the principles of the system described herein are equally applicable to other networks such as local-area networks. Authorization system 102 includes a content database 122 and a certificate database 124. Content database 122 includes digital data content that is available for distribution from authorization system 102. Such content can include, for example, data representing audiovisual works and/or computer software.

While content database 122 is shown to be included within authorization system 102, it is appreciated that it might be advantageous to separate content delivery from access authentication and to locate content database 122 on a different server system. One advantage is that content delivery tends to involve transfer of large amounts of data. Such transfers benefit from being delivered from distributed delivery servers that are located close to client computer systems receiving the delivered content. Conversely, authentication involves many small transactions that are less dependent upon fast data transfer rates but benefits from a centralized database of system-wide authentication. However, for simplicity, server and authentication tasks are both handled by authorization system 102, and authorization system 102 includes both content database 122 and certificate database 124.

Certificate database 124 includes data representing the manner in which previously distributed content of content database 122 is secured, either to a particular client computer system or to a particular human purchaser. The types of information stored in certificate database 124 are described more completely below. Briefly, such information includes digital certificates which are known authentication data structures, e.g., the known ITU-T X.509 certificate data structure.

Authorization system 102 also includes an authentication server 126 that is all or part of one or more computer processes executing within authorization system 102. Authentication server 126 receives requests through wide-area network 106 and serves such requests. Such requests include requests for machine-bound security for delivered content, for user-bound security for delivered content, and for conversion of security of delivered content in a manner described more completely below.

Client computer system 104 includes an acquired content database 144, a user database 146, one or more passports such as passport 148, a hardware identifier 140, and a content player 142. Acquired content database 144 includes content acquired from content database 122 and perhaps similar content databases. Such acquired content is secured in a manner described more completely below using one or more passports.

User database 146 stores information for one or more users of client computer system 104. Such information includes, for example, passwords by which users can authenticate themselves. "Password" is used herein to describe any data provided by a user for authentication purposes. Accordingly, "password" is used herein to describe both single-word passwords and multiple-word passwords that are sometimes generally referred to as passphrases.

Passports such as passport 148 represent the mechanism by which acquired content in acquired content database 144 is secured. Passports are issued by authentication server 126. A passport can secure content to a particular client computer system and/or to a particular user in a manner described more completely below.

Hardware identifier 140 uniquely identifies client computer system 104 within certificate database 124. In addition, hardware identifier 140 is derived from data that is difficult to change within client computer system 104, i.e., is read-only. For example, hardware identifier 140 can be a hash of data unique to one or more hardware components of client computer system 104 such as (i) a serial number of a processor of client computer system 104, (ii) a MAC address of a network access card by which client computer system 104 accesses wide-area network 106, and (iii) serial numbers of one or more hard disk drives installed in client computer system 104. In this illustrative embodiment, hardware identifier 140 is formed using the Interlok® software tool set available from PACE Anti-Piracy of San Jose, Calif.

Content player 142 is all or part of one or more computer processes executing within client computer system 104 and plays acquired content from acquired content database 144, which is sometimes referred to herein simply as "acquired content" or as "acquired content 144." For example, if acquired content represents audio works, content player 142 converts data of acquired content to data appropriately formatted for playback through a sound card and audio speakers of client computer system 104. Similarly, if acquired content represents audiovisual works, content player 142 converts data of acquired content to data appropriately formatted for playback through a sound card and audio speakers and to a video display of client computer system 104. Furthermore, if acquired content is computer software, content player 142 decodes computer instructions from acquired content and causes those decoded computer instructions to be executed by client computer system 104. Acquired content can include generally any kind of data including without limitation (i) audiovisual works such as music, other recorded sound, motion video, and still images; (ii) documents in such formats as ASCII text, rich text format (RTF), Microsoft® Word, and the portable document format (PDF) of Adobe® Acrobat®; and (iii) executable computer software.

Figure 2:
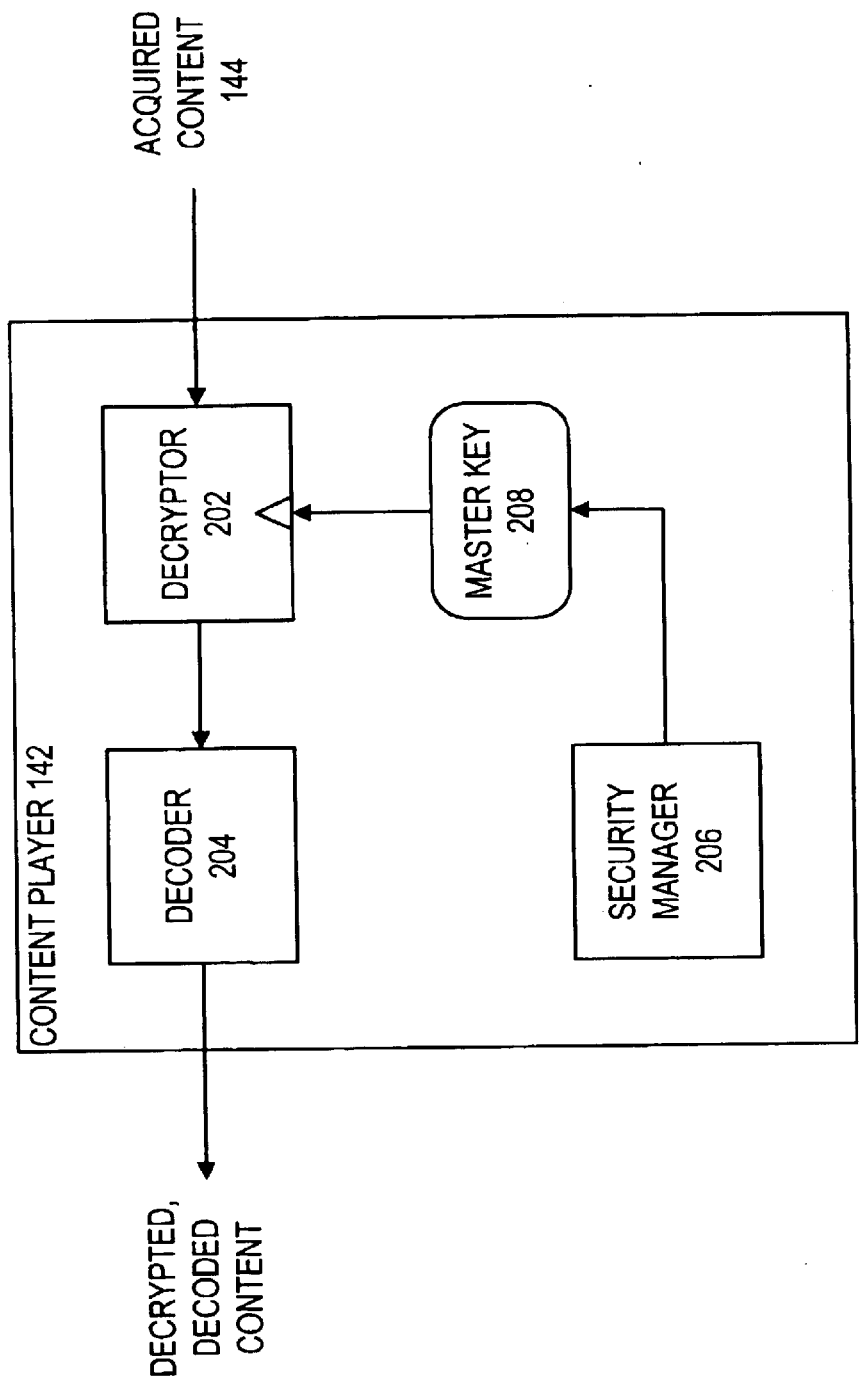
FIG. 2 is a block diagram of the content player of FIG. 1 in greater detail.

Content player 142 is shown in greater detail in FIG. 2. Content player 142 includes a decryptor 202 which decrypts acquired content 144 using a master key 208 provided by a security manager 206. In this illustrative embodiment, decryptor 202 uses symmetric key decryption algorithms such as FIPS 46-2 DES or RSA Security's RC4, for efficiency. Efficiency is important in this embodiment since acquired content must be both decrypted and decoded by a decoder 204 for real-time playback. As used herein, real-time playback means that playback by content player 142 requires a minimum amount of decrypted and decoded data from acquired content 144 per unit of time. For example, if acquired content 144 represent audio works, content player 142 must generally decrypt and decode 44,100 audio samples per second—176,400 bytes per second for CD-quality stereo audio.

While symmetric key decryption affords efficiency in decrypting acquired content 144, such requires that master key 208 is somehow communicated from server process 126 (FIG. 1), which uses master key 208 (FIG. 2) to encrypt the content, to content player 142. Security manager 206 derives master key 208 in a secure manner.

Figure 3A:
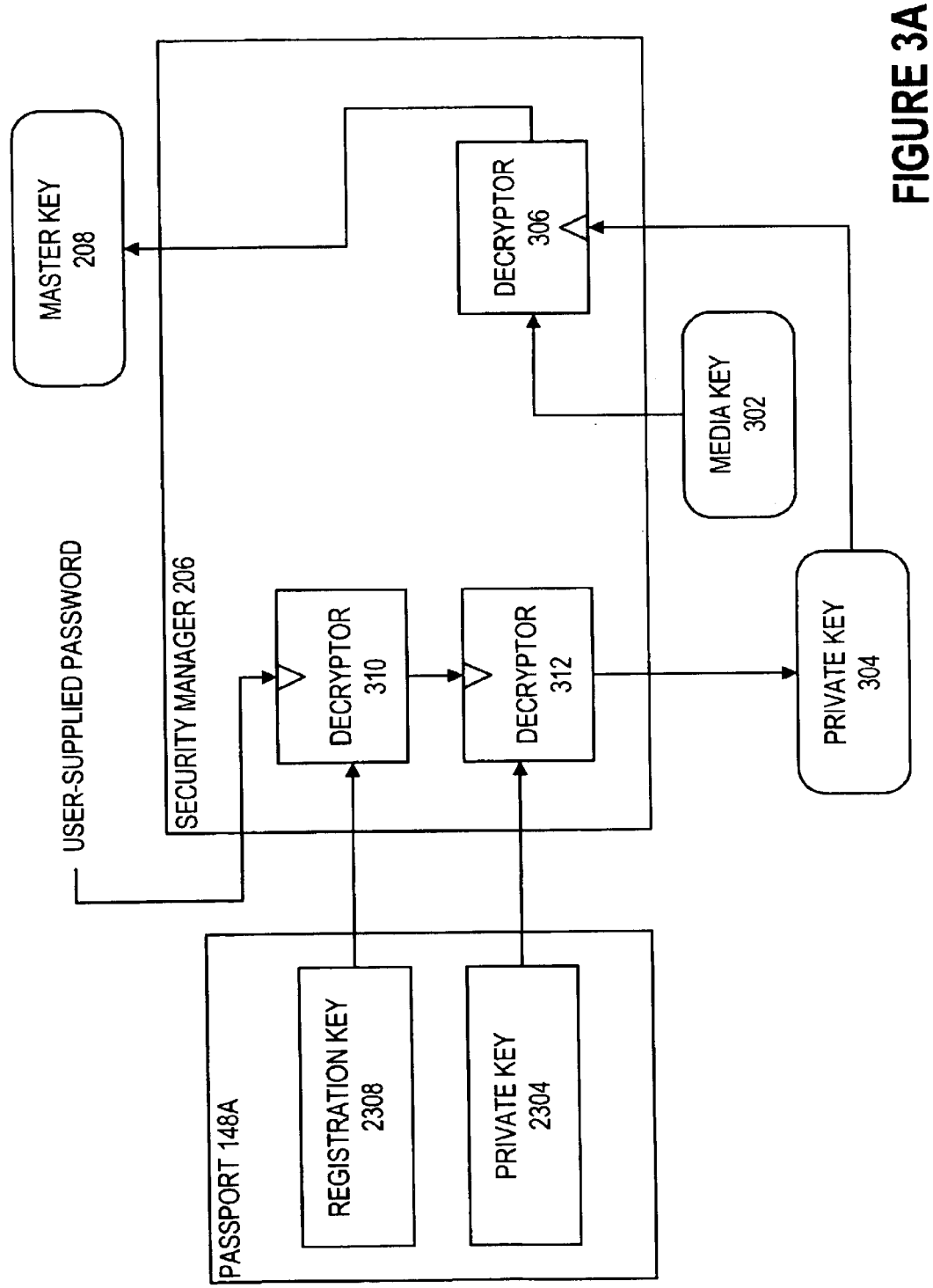
FIGS. 3A–B are block diagrams of the security manager of the content player of FIG. 2 in greater detail.
Figure 3B:
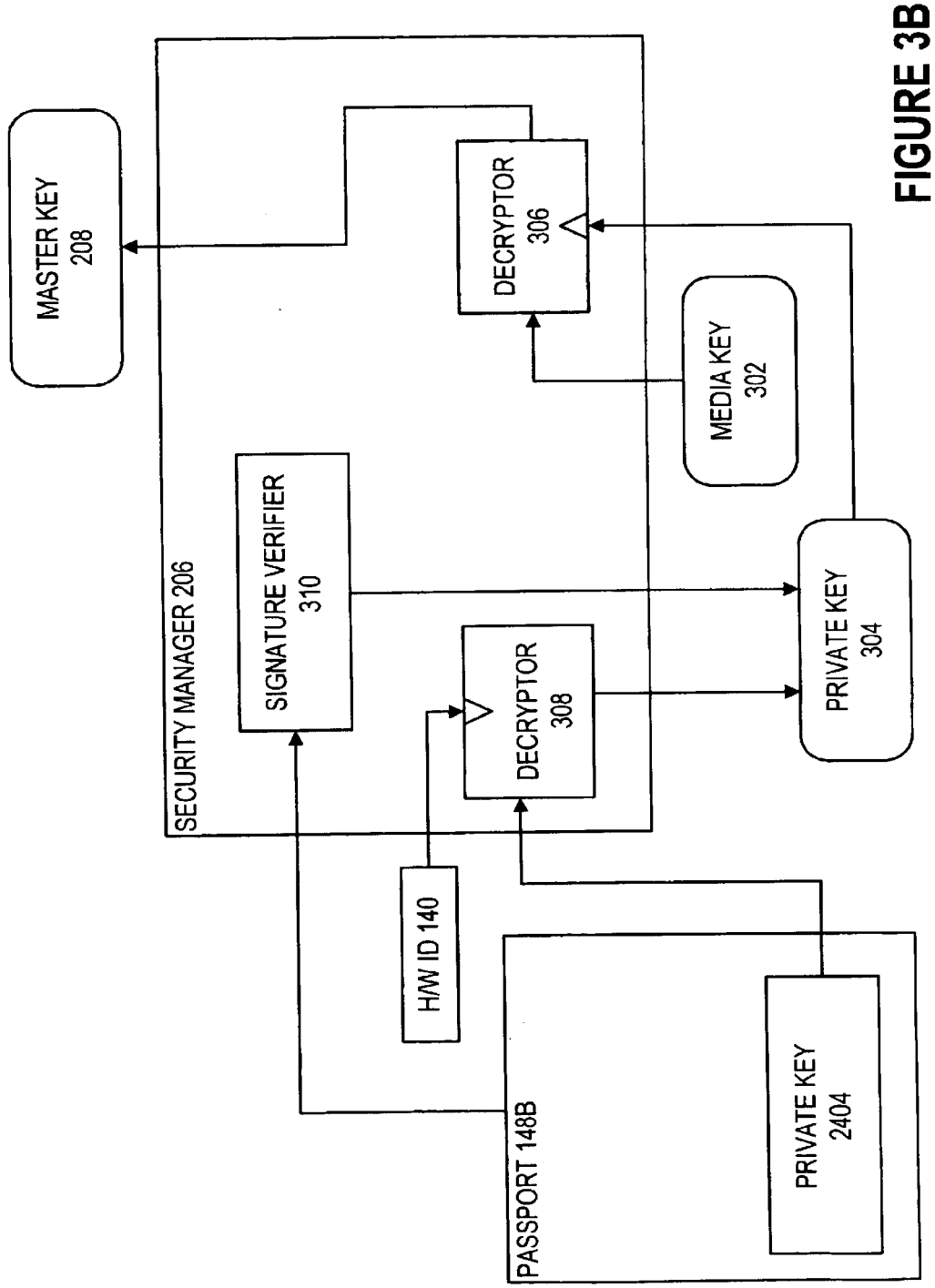

Security manager 206 is shown in greater detail in FIGS. 3A and 3B. FIG. 3A shows derivation of master key 208 from a user-bound passport 148A, and FIG. 3B shows derivation of master key 208 from a machine-bound passport 148B. Security manager 206 includes a decryptor 306 which uses a private key 304 to decrypt master key 208 from a media key 302 that is included within acquired content 144. Private key 304 is a private key of a private/public key pair within certificate database 124 (FIG. 1). Decryptor 306 (FIG. 3A) uses asymmetric key decryption, e.g., the known RSA public key algorithm of RSA Security.

Symmetric and asymmetric key encryption/decryption are known but are described briefly here for completeness. Symmetric key encryption uses the same key to encrypt and decrypt data. For example, data is encrypted using a specific data pattern referred to as a key. Encrypting the data scrambles the data in a manner that appears somewhat random and makes the data appear undecipherable. The encrypted data can be returned to its original, "clear" state by decrypting the data using the same specific key.

Asymmetric key encryption uses two keys that are associated with one another to form a pair. One key is kept private and the other key is made public; accordingly, the key pair is sometimes referred to as a private/public key pair. Encrypting with either key forms encrypted data that can be decrypted using the other key of the pair. The keys of the pair are therefore sometimes generally referred to as reciprocal to one another. Content player 142 (FIG. 1) can cryptographically sign data by encrypting the data using its private key. Any holder of the public key of content player 142 can verify the signature by decrypting the data using the public key of content player 142. Similarly, any holder of the public key of content player 142 can encrypt data using the public key such that the data can be decrypted only using the private key of content player 142. For example, server process 126 encrypts master key 208 (FIG. 3) for passport 148A using the public key of a key pair to form media key 302 and including the private key of the pair within passport 148A. As a result, media key 302 can be decrypted using the private key stored within passport 148A, i.e., player private key 304.

Security manager 206 obtains private key 304 from either a user-bound passport 148A (FIG. 3A) or a machine-bound passport 148B (FIG. 3B). A passport is a data structure by which a private key that is used to decrypt the media key, e.g., media key 208, of acquired content is bound to either a user or a computer system. A user-bound passport is bound to a particular user and can be transported to any computer system within which the user would like to playback acquired content. Accordingly, a user-bound passport is sometimes referred to as a full passport or a portable passport. A machine-bound passport is bound to a particular computer system for playback of acquired content and can be used by generally any user of the computer system.

It should be noted that security is provided by decryptor 306 in conjunction with media key 302 and private key 304. Passports 148A–B provide a data structure in which private key 304 can be bound to either a user or a specific computer system. Such binding limits portability of acquired content while providing the user a choice as to which type of binding is more convenient. In other words, the user can select either a machine-bound or a user-bound passport.

Figure 22:
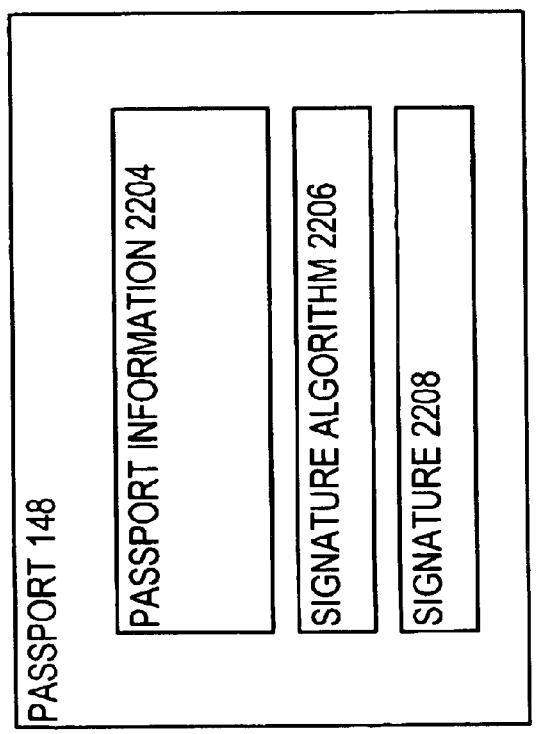
FIG. 22 is a block diagram showing passport of FIG. 1 in greater detail.

To facilitate understanding and appreciation of this flexibility with respect to private key binding, the structure of a passport is described. Passport 148 (FIG. 1) can be either machine-bound or user-bound. Passport 148 is shown in greater detail in FIG. 22 which shows components which are common to both machine-bound and user-bound passports. Passport 148 includes a passport information field 2204, a signature algorithm field 2206, and a signature field 2208.

Figure 24:
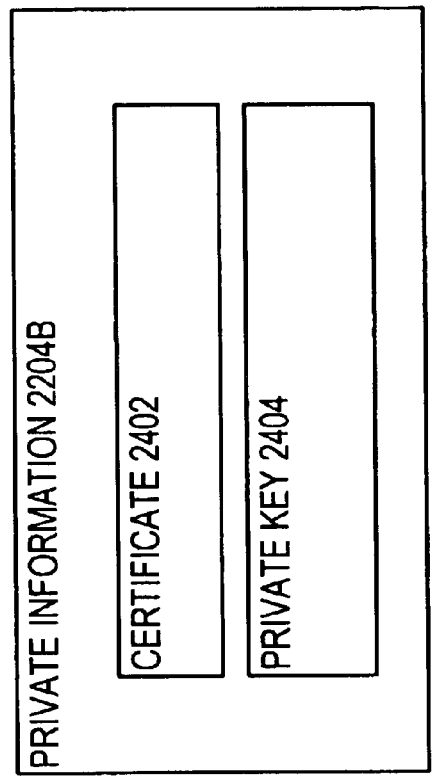
FIG. 24 is a block diagram of a machine-bound passport.

Passport information field 2204 contains data representing the substantive information of passport, including a private key by which acquired content bound to passport 148 can be decrypted. The type and structure of data stored in passport information field 2204 depends upon the type of passport. For example, passport 148A (FIG. 3A) is a user-bound, full passport and includes passport information 2204A of the type and structure described below in the context of FIG. 23. Passport 148B (FIG. 3B) is a machine-bound passport and includes passport information 2204B of the type and structure described below in the context of FIG. 24.

Signature algorithm field 2206 and signature field 2208 collectively specify a cryptographic signature of passport information field 2204. Signature algorithm field 2206 specifies the specific algorithm and any parameters thereof used to cryptographically sign passport information field 2204. Signature field 2208 contains data representing the resulting cryptographic signature using the private key of authentication server 126. Signature algorithm field 2206 and signature field 2208 provide an effective mechanism for determining whether data stored within passport information 2204 has been tampered with. For example, if a cracker changes data stored within passport information 2204, the cracker must create a corresponding signature such that such tampering would go undetected. However, since the private key of authentication server 126 is carefully guarded and held in the strictest secrecy, forging such a cryptographic signature is particularly difficult.

Passport information 2204B (FIG. 24) of machine-bound passport 148B is described below in the context of FIG. 3B. Passport information 2204A (FIG. 23) includes the following data components: (i) user certificate 2302, (ii) private key 2304, (iii) private user information 2306, and (iv) registration key 2308.

User certificate 2302 is a digital certificate by which the user is authenticated. Digital certificates and their use in authentication are known. In one embodiment, user certificate 2302 is in the form of an ITU-T X.509 digital certificate.

User certificate 2302 includes a public key 2320, validity dates 2322, a certificate serial number 2324, and a digital signature 2326. Public key 2320 is the reciprocal of private key 2304. To bind content to the user to which user-bound passport 148A is bound, master key 208 is encrypted using public key 2320 such that only private key 2304 can decrypt master key 208 from media key 302. Validity dates 2322 specify a time period during which user certificate 2302 is considered valid. Certificate serial number 2324 uniquely identifies user certificate 2302 within certificate database 124 (FIG. 1). Digital signature 2326 is a digital signature attached by the entity issuing user certificate 2302 and is used to verify that user certificate 2302 (i) has not been tampered with and (ii) was issued by the appropriate certificate authority.

Private key 2304 is the private key of the key pair used to encrypt master key 208 (FIG. 3A) to thereby form media key 302, e.g., private key 304. Accordingly, decrypting media key 302 by decryptor 306 of security manager 206 using private key 304 yields master key 208. In addition, private key 2304 is the reciprocal key of public key 2320 of user certificate 2302. Private key 2304 is encrypted using registration key 2308, which is described below.

Private user information 2306 contains information about the user to which passport 148A is bound. Such information is preferably private and guarded by the user. Private user information 2306 is displayed by client computer system 104 during playback of acquired content 144. Accordingly, the user is discouraged from sharing user-bound passport 148A since such would require sharing private user information 2306 as well. Private user information 2306 includes the user's name 2362 and the user's credit card information 2364. Credit card information 2364 can include, for example, the credit card number, expiration date, and billing address. During registration of the user, credit card information 2364 is verified to ensure that private user information 2306 is accurate. If credit card information 2364 is inaccurate, e.g., includes a stolen credit card number entered by the user for registration purposes, the user is not adequately discouraged from sharing private information 2306, and therefore passport 148A and any content bound thereto.

Private user information 2306 is encrypted using registration key 3208. Registration key 3208 is in turn encrypted using a password supplied by the user. Accordingly, the user's password is required to decrypt registration key 2308, which is in turn required to decrypt private key 2304 and private user information 2306. Registration key 2308 is stored within certificate database 124 in a format that is recoverable without the user's password such that a registration key 2304 can be generated for a new password in the event the user forgets his password.

Random number 2310 stores pseudo-random data and is included to frustrate cryptanalysis of encrypted passport information 2204A. Authentication server 126 generates a new random number each time passport 148A is reissued. Passport information 2204A is communicated through wide-area network 106 (FIG. 1) in an encrypted format. Accordingly, changes to random number 2310 propagate throughout passport information 2204A such that otherwise identical copies of passport information 2204A look entirely different in encrypted form. In one embodiment, random number 2310 is used only when transporting passport information 2204A, through wide-area network 106 for example, and is not stored in the persistent disk record of passport 148A.

To get private key 304 (FIG. 3A), decryptor 310 of security manager 206 decrypts registration key 2308 using the user-supplied password. The user supplies the password using conventional user-interface techniques is response to a prompt displayed to the user by content player 142. The result of decrypting registration key 2308 is used as a key by decryptor 312 to decrypt private key 304 from private key 2304. Private key 304 is used in the manner described above to obtain master key 208 by which acquired content can be decrypted for playback.

Figure 23:
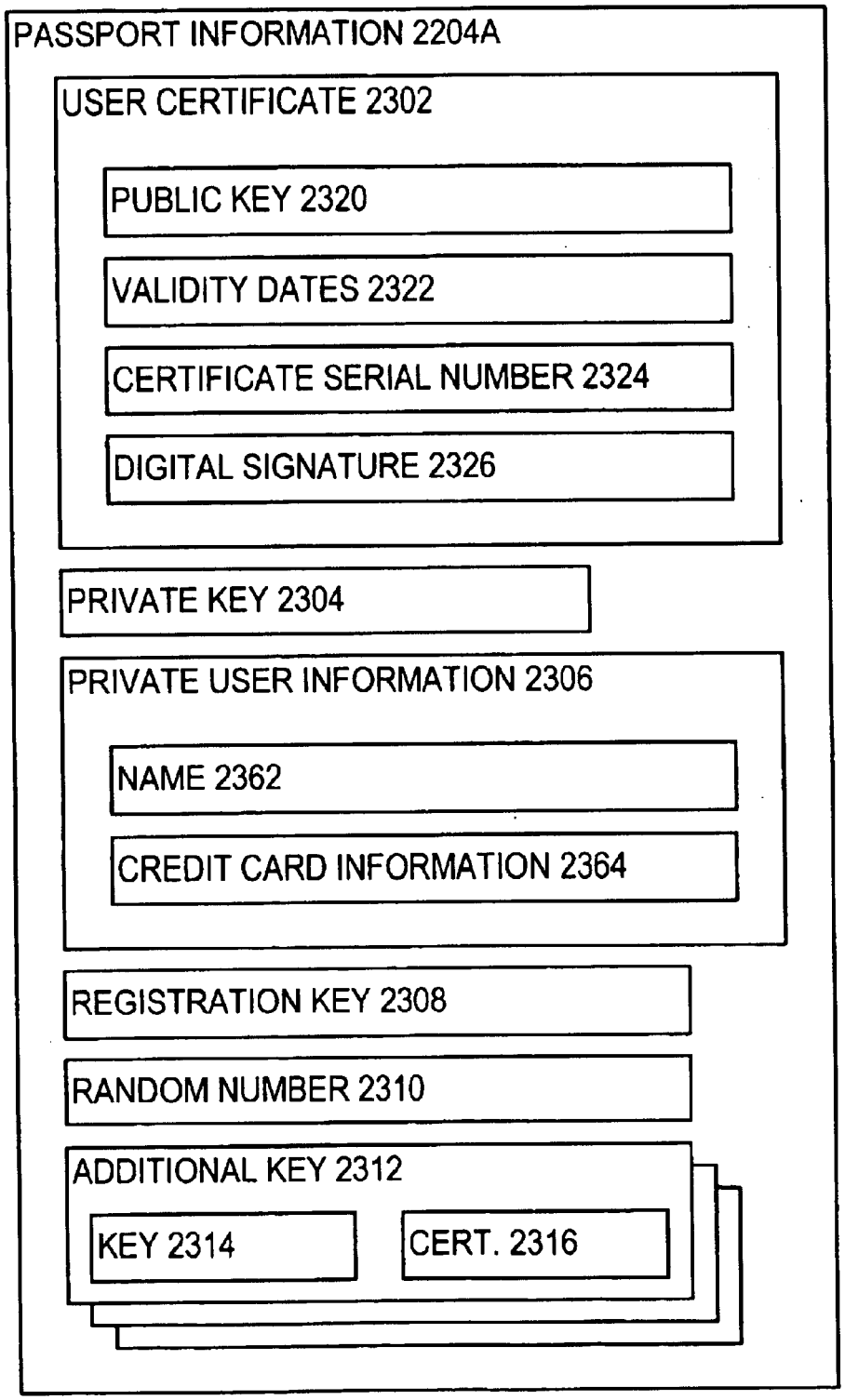
FIG. 23 is a block diagram of a user-bound passport.

Machine-bound passport 148B (FIG. 3B) is bound to client computer system 104 and not to any particular user. As a result, playback of acquired content bound to passport 148B does not display private user information such as private user information 2306 (FIG. 23). Instead, private key 2404 (FIG. 3B) of machine-bound passport 148B is encrypted using as a key the hardware identifier of the computer system to which passport 148B is bound. In this example, passport 148B is bound to client computer system 104 (FIG. 1), and private key 2404 (FIG. 3B) is encrypted using hardware identifier 140. Accordingly, private key 2404 is decrypted by decryptor 308 using hardware identifier 140 as a key to thereby yield private key 304. Therefore, passport 148B is only useful when hardware identifier 140 is available, i.e., when passport 148B is used within client computer system 104. If passport 148B is copied to another computer system which has a hardware identifier which is not equivalent to hardware identifier 140, private key 304 cannot be derived from private key 2404. Accordingly, passport 148B binds acquired content 144 to client computer system 104.

When content of content database 122 (FIG. 1) is purchased, authentication server 126 assists in binding the purchased content either to the computer system to which the content is to be delivered or to the purchasing user. The user is provided with the option as to which type of binding is preferred. In one embodiment, the option is presented to the user upon first installing content player 142 in client computer system and that choice is recorded and honored until the user actively makes a different choice. If the user would like to access the content on multiple computer systems (or at least a computer system other than the one used to make the purchase), the user selects user-binding afforded by a passport such as passport 148A (FIG. 3A).

Alternatively, if the user would prefer not to provide private user information such as private user information 2306 (FIG. 23) and is willing to access the content only on the particular computer system through which the purchase is conducted, the user selects machine-binding afforded by a passport such as passport 148B (FIG. 3B).

To prepare content for binding to either a user or a computer system, the content is encrypted using a master key such as master key 208 (FIG. 4) which is in turn encrypted by an encryptor 406 to form media key 302. Media key 302 is included with the encrypted content. A public key 304B is used in conjunction with asymmetric encryption to form media key 302 such that media key 302, and therefore the encrypted content itself, can only be decrypted with private key 304.

Figure 4:
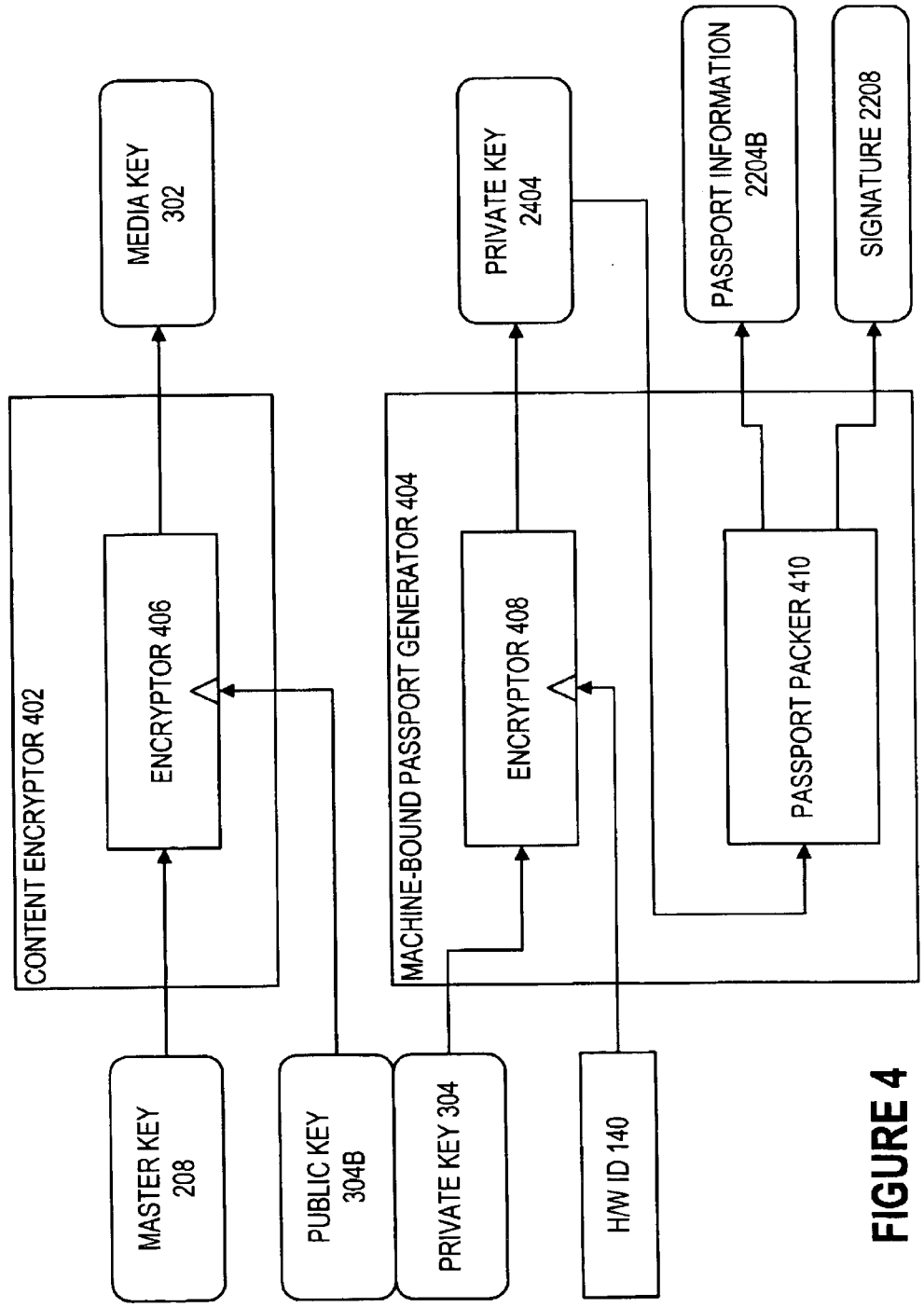
FIG. 4 is a block diagram of a machine-bound passport generator in accordance with the present invention.

To bind content to a particular computer system, authentication server 126 includes a machine-bound passport generator 404 (FIG. 4). Within certificate database 124 (FIG. 1), authentication server 126 stores private/public key pairs for all content players registered with authentication server 126 such as content player 142. To facilitate understanding and appreciation of the operation of authentication server 126, the type and structure of data stored within certificate database 124 is described more completely in the context of FIG. 17.

Certificate database 127 includes a number of tables, namely, (i) a table of account records 1702, (ii) a table of key records 1704, and (iii) a table of history records 1706. An account record such as account record 1702 stores data pertaining to a particular user within content distribution system 100 (FIG. 1). A key record such as key record 1704 (FIG. 17) represents a private/public key pair used to encrypt delivered content in the manner described above and includes usage parameters of the key pair such as expiration and limits on the number of times the key pair can be reissued. Reissue of a key pair is described below in greater detail. A history record such as history record 1706 represents an event such as reissue of a key pair or conversion of a passport from machine-bound to user-bound. Fraud and/or unauthorized copying of passports and/or content can sometimes be detected by examining history records. For example, requests by the same user from many different client computer systems to replace lost keys suggests that a user has provided numerous copies of her passport to others.

Figure 20:
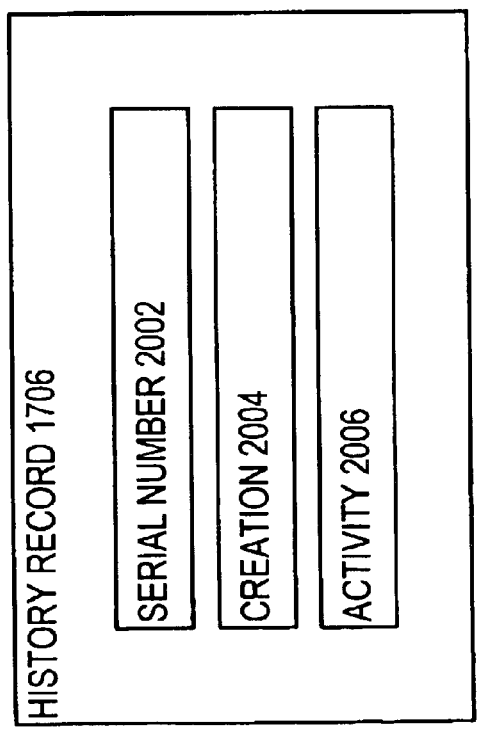
FIG. 20 is a block diagram showing the history record of FIG. 17 in greater detail.

Account record 1702 is shown in greater detail in FIG. 18 and includes the following fields: (i) serial number field 1802, (ii) name field 1804, (iii) e-mail address field 1806, (iv) country field 1808, (v) question field 1810, (vi) answer field 1812, (vii) status field 1814, and (viii) type field 1816. Serial number field 1802 stores a serial number that is unique within serial numbers processed within authentication server 126. Serial numbers are used in this illustrative embodiment to associate related records. For example, if account record 1702 represents a specific user and key record 1704 (FIG. 19) represent the user's private/public key pair, the serial number stored in serial number field 1802 (FIG. 18) is equivalent to the serial number stored in serial number field 1902 (FIG. 19). Furthermore, history records pertaining to the user's account and keys can be found by locating history records with an equivalent serial number stored in serial number field 2002 (FIG. 20).

Name field 1804 (FIG. 18) stores data representing the name of the user who owns the account represented by account record 1702. E-mail address field 1806 stores data representing the user's e-mail address. Country field 1808 stores data representing the user's country of residence.

Question field 1810 and answer field 1812 are used to authenticate the user, for example, when a request to modify account record 1702 is received. Question field 1810 specifies a question to be asked of the user, and answer field 1812 specifies the correct response. For example, the question can be regarding the user's mother's maiden name.

Status field 1814 represents the status of the account. Status values stored within status field 1814 include "valid" and "revoked." Type field 1814 represents the type of account. Type values stored within type field 1814 include "machine-bound" and "user-bound."

Key record 1704 is shown in greater detail in FIG. 19 and includes the following fields: (i) serial number field 1902, (ii) private key field 1904, (iii) public key field 1906, (iv) validity dates field 1908, (v) reissue limit field 1910, (vi) passport key limit 1912, and (vii) hardware identifier 1914. Serial number field 1902 stores the serial number to which the key record corresponds. Private key field 1904 and public key field 1906 store the private and public keys, respectively, of the private/public key pair represented by key record 1704.

Validity dates field 1908 specifies dates for which certificates created from key record 1704 are valid. When the validity end date in key record 1704 has expired, certificates created from key record 1704 can no longer be used to purchase content from content database 122. However, certificates created from key record 1704 in the manner described below continue to correctly decrypt previously acquired content. When key record 1704 is renewed, validity dates field 1908 is updated to specify new, different validity dates and private key 1904 and public key 1906 remain unchanged. As a result, content acquired using an expired passport based on key record 1704 can be decrypted using a renewed version of the same passport, i.e., created from a renewed version of key record 1704, since the renewed passport includes the same keys. However, it should be appreciated that renewal can require that the user change her password and, as a result, components of the passport which are encrypted with the user's password will look different.

Reissue limit field 1910 specifies a maximum number of times this the keys of key record 1704 can be reissued in the manner described more completely below. Passport key limit field 1912 specifies the maximum number of keys that can be held by a passport held by the owner of the associated account as determined by serial number field 1902 in the manner described above. Hardware identifier field 1914 represents a hardware identifier to which the key pair is bound in the manner described above. For example, if hardware identifier field 1914 represents hardware identifier 140, a machine-bound passport including the private key represented in private key field 1904 is encrypted using hardware identifier 140.

Figure 17:
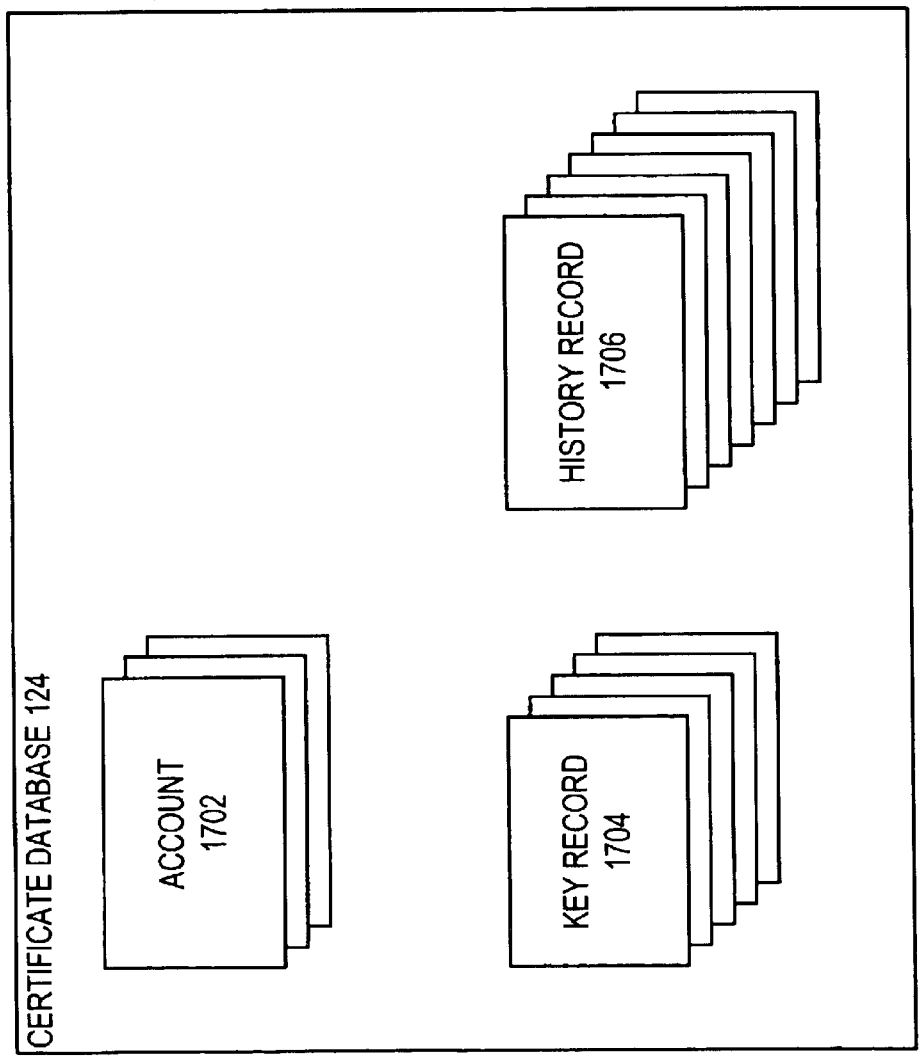
FIG. 17 is a block diagram showing the certificate database of FIG. 1 in greater detail.

History record 1706 (FIG. 17) is shown more completely in FIG. 20 and includes the following fields: (i) serial number field 2002, (ii) creation field 2004, and (iii) activity field 2006. Serial number field 2002 stores a serial number which is analogous to that described above with respect to serial number fields 1802 (FIG. 18) and 1902 (FIG. 19). Creation field 2004 (FIG. 20) specifies a time when history record 1706 is created. Activity field 2006 specifies the type of activity associated with the serial number of serial number field 2002 to be recorded in the table of history records 1706 (FIG. 17). Types represented by activity field 2006 include, for example, reissue of a key, renewal of a key, and addition of a key to a user-bound passport.

Figure 21:
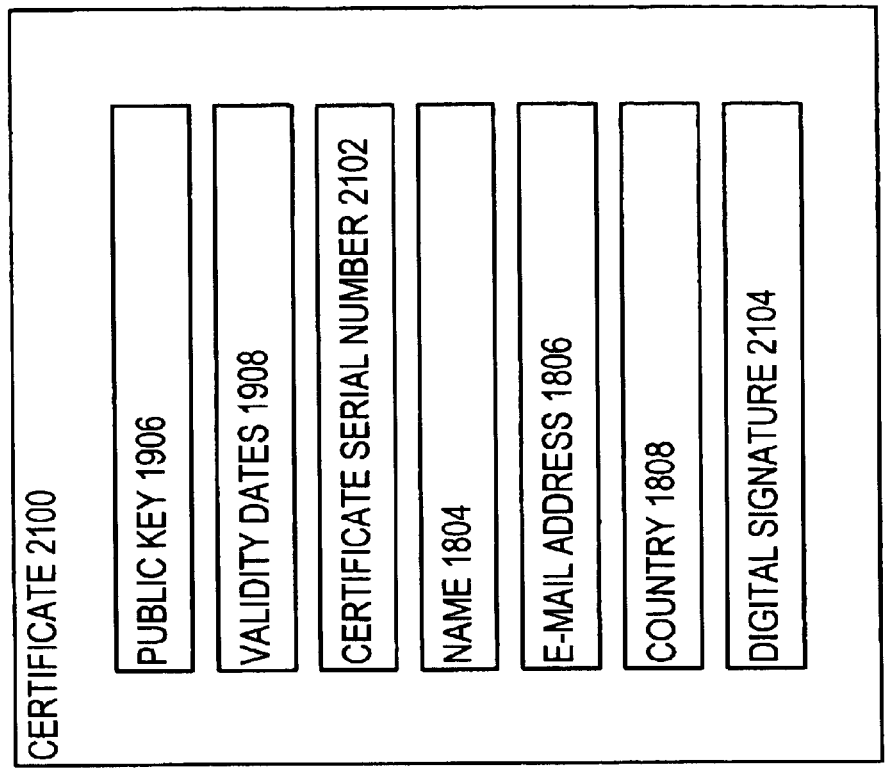
FIG. 21 is a block diagram of a certificate.

Authentication server 126 can create a digital certificate, for example, an ITU-T X.509 certificate, from fields of account record 1702 and key record 1704 as shown in FIG. 21. In particular, certificate 2100 includes public key 1906 and validity dates 1908 from key record 1704 (FIG. 19) and name 1804 (FIG. 21), e-mail address 1806, and country 1808 from account record 1702 (FIG. 18). In addition, certificate 2100 includes a certificate serial number 2102 which, in this illustrative embodiment, comports with the ITU-T X.509 specification. It should be noted that certificate serial number 2102 is unrelated to and independent of serial numbers 1802 (FIG. 18), 1902 (FIG. 19), and 2002 (FIG. 20). Certificate 2100 also includes a digital signature 2104 created by authentication server 126 from the private key of authentication server 126 in compliance with the ITU-T X.509 specification in this illustrative embodiment.

Certificate database 124 provides a comprehensive and flexible basis for authentication of acquired content, whether machine-bound or user-bound.

Returning now to machine-bound passport generator 404 (FIG. 4), master key 208 can only be decrypted from media key 302 using private key 304. Therefore, to bind media key 302, and any content associated therewith, to client computer system 104 (FIG. 1), private key 304 is encrypted within an encryptor 408 to form private key 2404 using hardware identifier 140 as a key. Thus, hardware identifier 140 is required to decrypt and restore private key 304 which is then needed to decrypt and restore master key 208 which is in turn needed to decrypt the acquired content encrypted therewith. Hardware identifier 140 is represented in hardware identifier field 1914 of key pair 1704 which includes private key 304 and public key 304B in private key field 1904 and public key field 1906, respectively.

Private key 2404 is included in passport information 2204A by a passport packer 410 which also signs passport information 2204B using the private key of authentication server 126 to form signature 2208. In addition, passport packer 410 sends passport information 2204B and signature 2208 to content player 142 through a secure channel in the manner described more completely below. Thus, machine-bound passport generator 404 binds content encrypted with master key 208 to hardware identifier 140.

Authentication server 126 also includes a full passport generator 504 (FIG. 5) which creates user-bound passports such as passport 148A (FIG. 3A). Encryptor 406 encrypts master key 208 using public key 304B to form media key 302 in the manner described above.

Full passport generator 504 (FIG. 5) includes an encryptor 508 which encrypts the reciprocal key, i.e., private key 304, using a clear registration key 520 to form private key 2304. Accordingly, private key 2304 is obscured and ready for inclusion in passport information 2204A. Clear registration key 520 is encrypted by an encryptor 506 using a user-supplied password as a key to form registration key 2308. To discourage distribution of the resulting full passport to other users, a passport packer 510 packages private key 2304 and registration key 2308 with private user information 2306 to form passport information 2204A. In addition, passport packer 510 forms signature 2208 to detect and prevent tampering with passport information 2204A. In one embodiment, private user information 2306 is encrypted using the user-supplied password to protect the user's private information when acquired content is not being played back. To successfully decrypt acquired content encrypted with master key 208 using passport information 2204A, the authenticity of signature 2208 is verified and private key 2304 and registration key 2308 are parsed from passport information 2204A. Registration key 2308 is then decrypted using a key supplied by the user and, after decryption, used to decrypt private key 304 from private key 2304. Private key 304 is then used to decrypt master key 208 from media key 302 which is parsed from the acquired content. Passport packer 510 sends passport information 2204A and signature 2208 to content player 142 through a secure channel in the manner described more completely below.

At some point, a user who has previously opted to play acquired data only using client computer 104, i.e., who has previously opted for machine-binding, may prefer to upgrade from machine-binding to user-binding such that the user can play acquired content using a different computer system. For example, the user may have replaced his previous computer system with a new one or may have acquired an additional computer system. Conversion by authentication server 126 of a machine-bound passport such as passport 148B to a user-bound passport such as passport 148B is performed by a passport converter 602 (FIG. 6A).

To convert the passport, passport converter 602 receives hardware identifier 140, private user information 2306, and the user-supplied password. These elements are received from client computer system 104 through a secure connection. Private user information 2306 and the user-supplied password are entered by a user of client computer system 102 at the time of conversion since such information is required in a user-bound password but not required in a machine-bound passport. An important consideration in the conversion from machine-bound is that no modification to any acquired content is required. In essence, the core private key required to decrypt the acquired content, e.g., private key 304, is preserved within the converted passport such that media key 302 can remain unchanged.

Figure 6A:
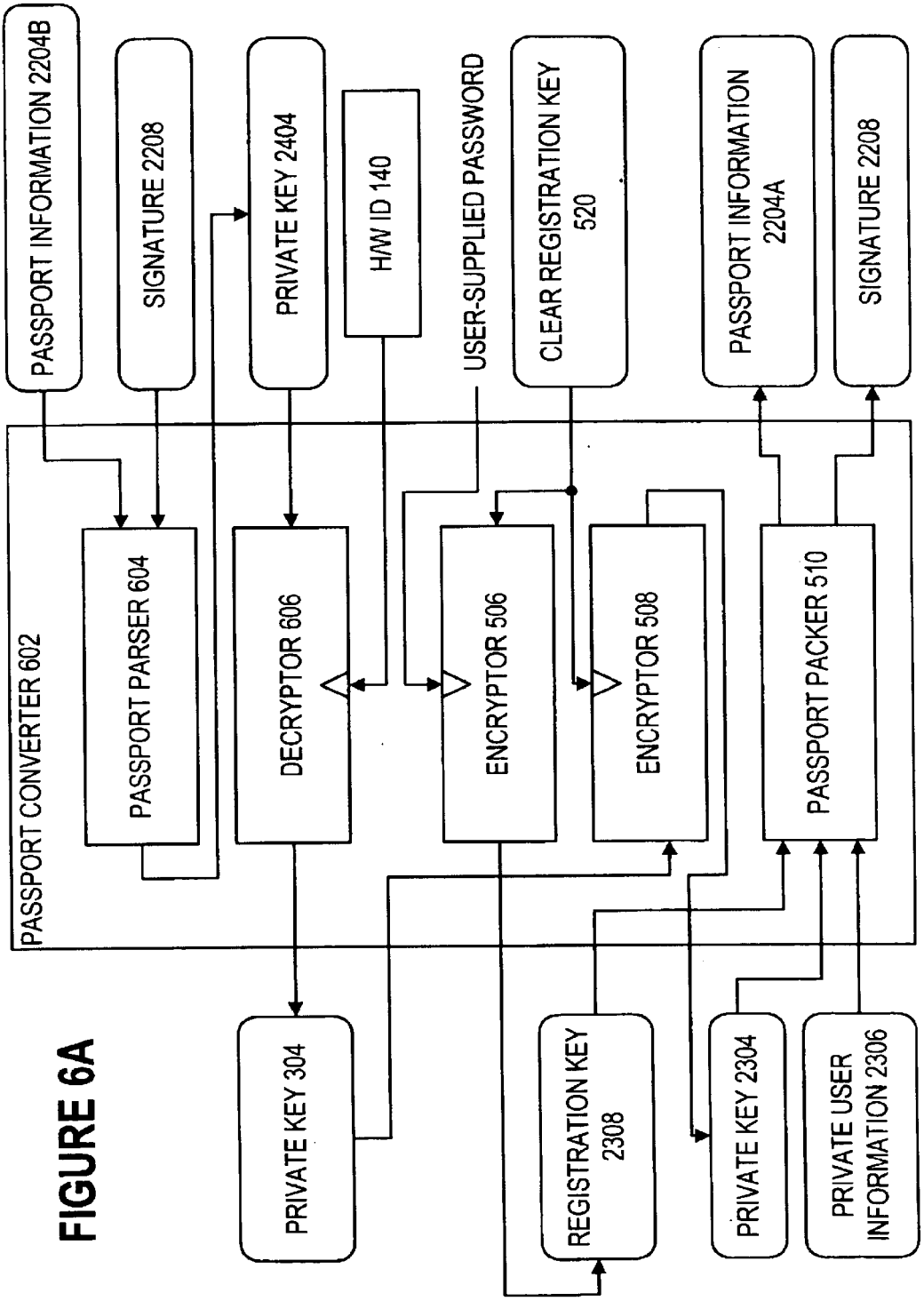
FIG. 6A is a block diagram of a passport converter that converts a machine-bound passport to a full passport in accordance with the present invention.

Passport converter 602 of FIG. 6A is a somewhat simplified embodiment in which the majority of processing is performed by authentication server 126. An alternative embodiment in which some of the elements of passport converter 602 are part of content player 142 is described below in the context of FIG. 6B.

Passport converter 602 includes a passport parser 604 which verifies signature 2208B of the passport to be upgraded and parses private key 2404 from passport information 2204B. In addition, passport converter 602 includes a decryptor 606 which decrypts private key 2404 using hardware identifier 140 as a key to re-derive private key 304. Alternatively, authentication server 126 uses hardware identifier 140 to retrieve key record 1704 (FIG. 19) corresponding to keys 304 and 304B according to hardware identifier field 1914 from certificate database 124. In either case, private key 304 (FIG. 6A) is necessary to play any acquired content previously bound to client computer system 104 using hardware identifier 140.

Passport converter 602 includes encryptors 506 and 508 which form private key 2304 and registration key 2308 in the manner described above in the context of FIG. 5. Private user information 2306 is also encrypted using the user-supplied password as a key. Passport converter 602 includes passport packer 510 which packages private key 2304, registration key 2308, and private user information 2306 to form passport information 2204A. Passport packer 510 forms signature 2208 to detect and prevent tampering with passport information 2204A. As described above with respect to FIG. 3B, a user-bound passport such as passport 148A binds acquired content to a specific user through requiring the user-supplied password and through display of private user information 2306 (FIG. 23). Passport 148A and any content accessible therethrough are not bound to hardware identifier 140 and can be moved to other computer systems for playback.

Logic flow diagram 650 (FIG. 6B) shows conversion of machine-bound passport 148B to user-bound passport 148A in accordance with an alternative embodiment. In step 652, content player 142 encrypts hardware identifier 140 using the public key of passport 148B, e.g., the public key of certificate 2402. In step 654, content player 142 sends the certificate of passport 148B and the encrypted hardware identifier to authentication server 126 as part of a request to upgrade passport 148B to a user-bound passport.

Figure 6B:
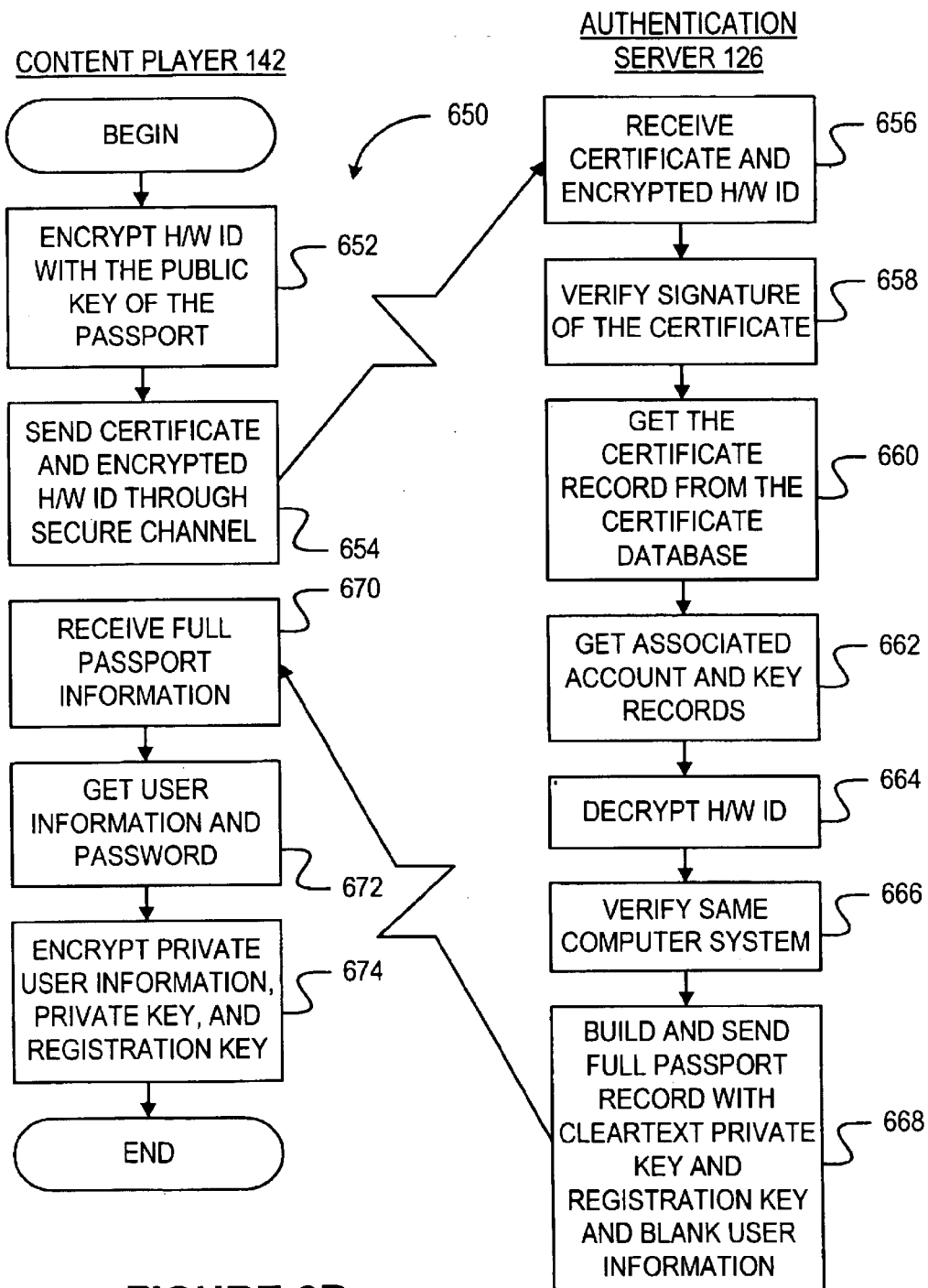
FIG. 6B is a logic flow diagram illustrating conversion of a passport in accordance with an alternative embodiment.

In step 656, authentication server 126 receives the certificate and encrypted hardware identifier from content player 142. In step 658, authentication server 126 verifies the signature of the certificate. Authentication server 126 retrieves the certificate record, e.g., certificate record 2100 (FIG. 21), corresponding to the received certificate from certificate database 124 in step 660 (FIG. 6B). In step 662, authentication server 126 gets the associated account record, e.g., account record 1702, and key record, e.g., key record 1704.

In step 664, authentication server 126 decrypts the received encrypted hardware identifier using the private key of the retrieved key record, e.g., private key 1904 of key record 1704. In step 666, authentication server 126 compares the decrypted hardware identifier to the hardware identifier of the retrieved key record, e.g., hardware identifier 1914 of key record 1704. If the hardware identifiers do not match, conversion of passport 148B fails. Otherwise, conversion continues.

In step 668, authentication server 126 builds and sends a full passport record with a cleartext private key and registration key and blank user information. Cleartext is used herein as in common usage in cryptography to mean un-encrypted and not necessarily human intelligible text. It should be noted that a key can be formed using an encryption algorithm but is considered cleartext if the key does not require decryption prior to using the key, for example, to encrypt/decrypt other data. The full passport record is sent to content player 142 through a secure channel.

In step 670, content player 142 receives the full passport record from authentication server 126. Content player 142 receives a user-supplied password and private user information from the user by conventional user-interface techniques in step 672.

In step 674, content player 142 encrypts the private user information, private key, and registration key using the user-supplied password in the manner described above with respect to encryptors 506–508 (FIG. 6A) and passport packer 510.

Use of Convertible Passports for Purchase and Playback of Data

Figure 7:
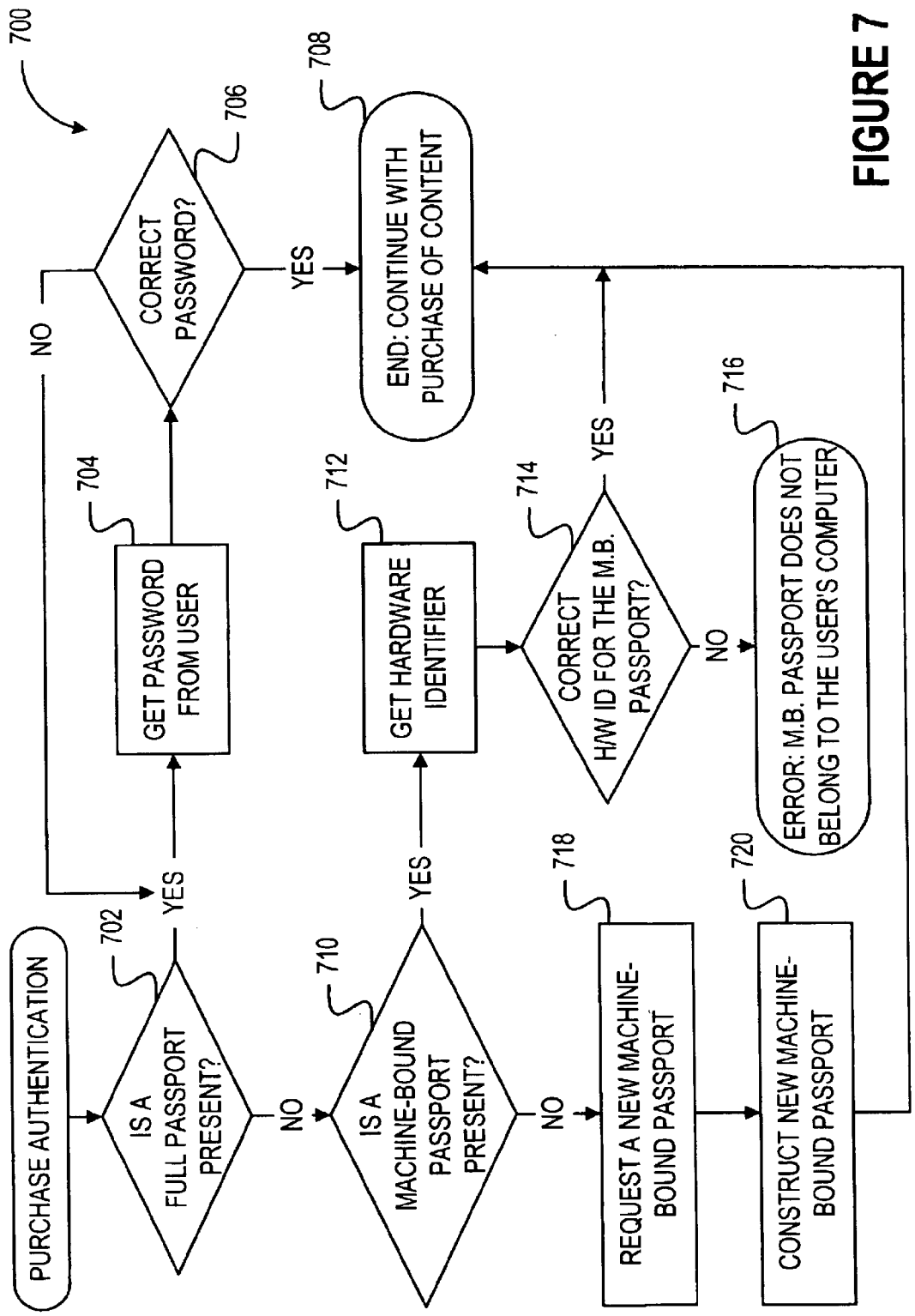
FIG. 7 is a logic flow diagram of the authentication of a user for digital data acquisition in accordance with the present invention.

Logic flow diagram 700 (FIG. 7) illustrates authentication by content player 142 (FIG. 1) during a purchase of data by a purchasing user. In test step 702 (FIG. 7), content player 142 (FIG. 1) determines whether a full, user-bound passport is present. In one embodiment, content player 142 includes a registry of one or more passports associated with data that can be played through content player 142. If a full passport is present, processing transfers to step 704 (FIG. 7) in which the purchasing user enters a password using conventional user-interface techniques. In test step 706 (FIG. 7), content player 142 determines whether the entered password corresponds to the full passport determined to be present in test step 702 which is sometimes referred to herein as the selected full passport. Content player 142 makes such a determination by attempting to decrypt private key 2304 (FIG. 23) of the selected full passport. In this illustrative embodiment, private key 2304 is encrypted using the known PKCS #5 password encryption algorithm of RSA Security and use of that algorithm provides a signal indicating whether the password used to decrypt private key 2304 is the correct password. If the password does not correspond to the selected full passport, processing transfers back to step 704 and the user enters another password. If the password corresponds to the selected full passport, processing transfers to step 708 in which processing of the purchase of content continues.

The purchase includes selection of specific content to be purchased and payment authorization. The specific content selected by the user for purchase is sometimes referred to herein as the selected content. Content player 142 provides the certificate inside its passport specifying the selected full passport as the passport to which the selected content should be bound, and authentication server 126 binds the content to the selected certificate in the manner described above with respect to FIG. 5. In particular, the master key of the selected content is encrypted by encryptor 406 using player public key 304B as the key to form media key 302. Full passport generator 504 is not used since the selected full passport already exists within content player 142. Use of public key 304B to encrypt master key 208 binds the content to a passport that includes private key 304. The certificate serial number, e.g., certificate serial number 2102, included in the selected content identifies to which passport the selected content is bound.

Returning now to test step 702 (FIG. 7), if no full passport is present within content player 142, processing transfers to test step 710. In test step 710, content player 142 determines whether a machine-bound passport is present. If no machine-bound passport is present, processing transfers to step 718 which is described below. Conversely, if a machine-bound passport is present, processing transfers to step 712.

In step 712, content player 142 retrieves hardware identifier 140. In test step 714, content player 142 determines whether hardware identifier 140 is the hardware identifier corresponding to the machine-bound passport located by content player 142. In one embodiment, such a determination is made by attempting to decrypt private key 2404 using hardware identifier 140 using a decryption algorithm, such as the RSA PCKS #5 algorithm, which indicates whether the key used for decryption is the correct key. If not, processing transfers to step 716 in which an error message is presented to the user. The error message indicates that the located machine-bound passport does not belong to client computer system 104. Content player 142 can respond in various ways to such an error. For example, content player 142 can instruct the user to delete the erroneous machine-bound passport and re-initiate processing according to logic flow diagram 700 (processing will reach steps 718 et seq. below in the subsequent iterative processing according to logic flow diagram 700). Content player 142 can also report such an error to authentication server 126 such that unauthorized distribution of machine-bound passports can be tracked.

If, however, hardware identifier 140 is the correct identifier, processing transfers from test step 714 to step 708 and the purchase process continues in the manner described above, except that any purchased content is bound to a machine-bound passport. In requesting the selected content, content player 142 sends its certificate to authentication server 126. Authentication server 126 uses the public key of that certificate to encrypt master key 208 to thereby bind the selected content to content player 142. The machine-bound passport detected by content player 142 already includes the private key of content player 142 encrypted using hardware key 140.

Figure 8:
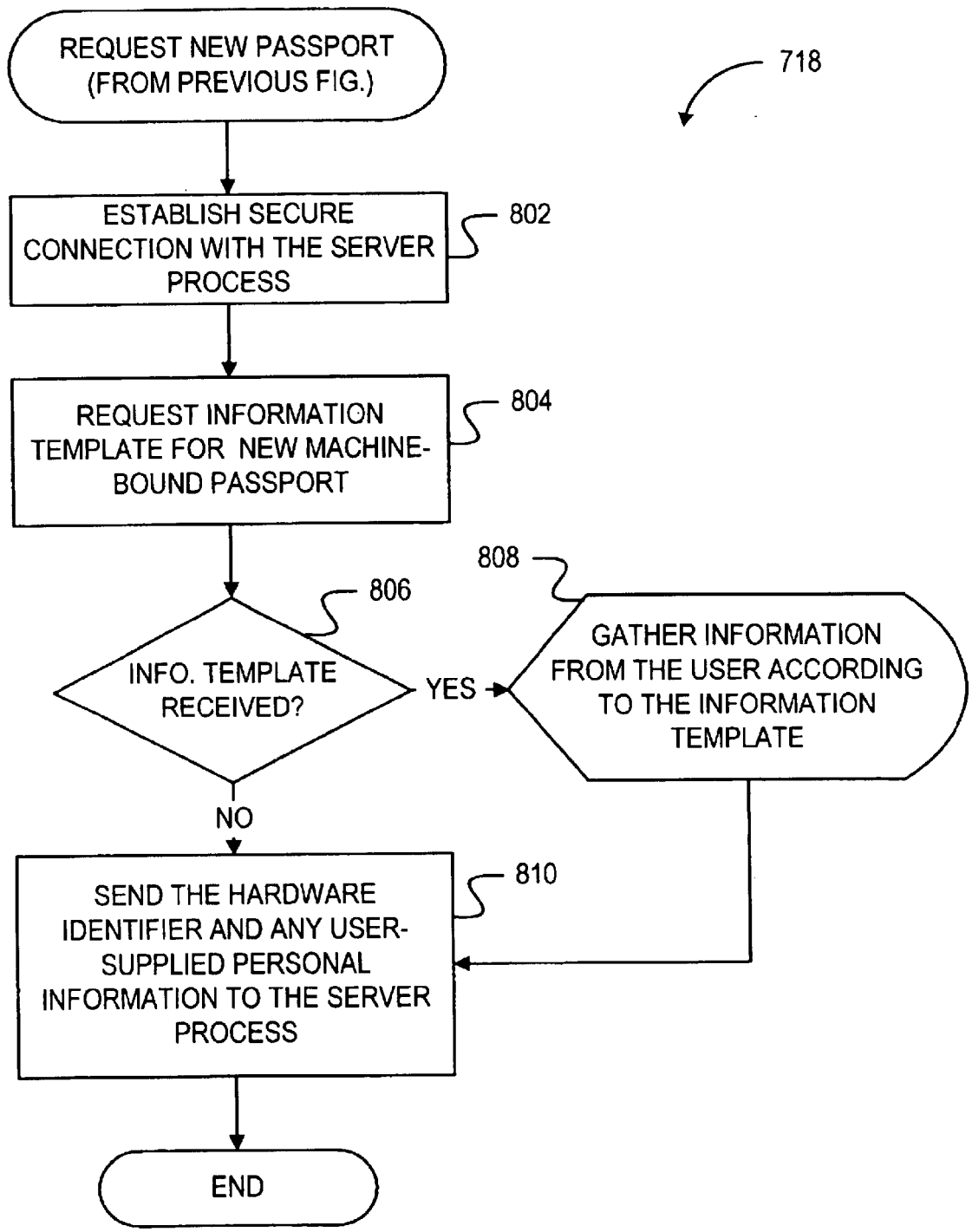
FIG. 8 is a logic flow diagram of the acquisition of a new machine-bound passport during user authentication in accordance with the present invention.

Returning to test step 710 (FIG. 7); if no machine-bound passport is found by content player 142, content player 142 has no passports at all and processing transfers to step 718. In step 718, content player 142 requests a new machine-bound passport from authentication server 126. Step 718 is described more completely below in conjunction with logic flow diagram 718 (FIG. 8). After step 718, content player 142 constructs a new machine-bound passport from a machine-bound passport record received from authentication server 126. After step 720, the purchase of content continues in step 708 in the manner described above.

Logic flow diagram 718 (FIG. 8) shows the requesting of a machine-bound passport in greater detail. In step 802, content player 142 establishes a secure connection with authentication server 126. Such a secure connection is described below in greater detail. In step 804, content player 142 requests an information template for a new machine-bound passport. In response to such a request, authentication server 126 sends an information template for new machine-bound passports. An information template is a collection of data specifying user-supplied data fields and prompts therefore. In one embodiment, the information template is an XML description of the data to collect from the user. If an information template is received by content player 142, processing transfers through test step 806 to step 808 in which content player 142 gathers information specified in the received information template. Such information can be entered by the user using conventional user-interface techniques. Processing transfers to step 810. If no information template is received, processing transfers straight through test step 806 to step 810, skipping step 808.

In step 810, content player 142 sends hardware identifier 140 and any user-supplied information to authentication server 126 as a request for a new machine-bound passport. After step 810, processing according to logic flow diagram 718, and therefore step 718 (FIG. 7), completes.

Logic flow diagram 900 (FIG. 9) illustrates processing by authentication server 126 (FIG. 1) in response to a request for a new machine-bound passport made by content player 142 in step 810 (FIG. 8). In step 902 (FIG. 9), authentication server 126 receives the hardware identifier and any user-supplied information. In test step 904, authentication server 126 determines whether any key records corresponding to the received hardware identifier exist in certificate database 124. Authentication server 126 makes such a determination by searching for key records, e.g., key record 1704 (FIG.

Figure 9:
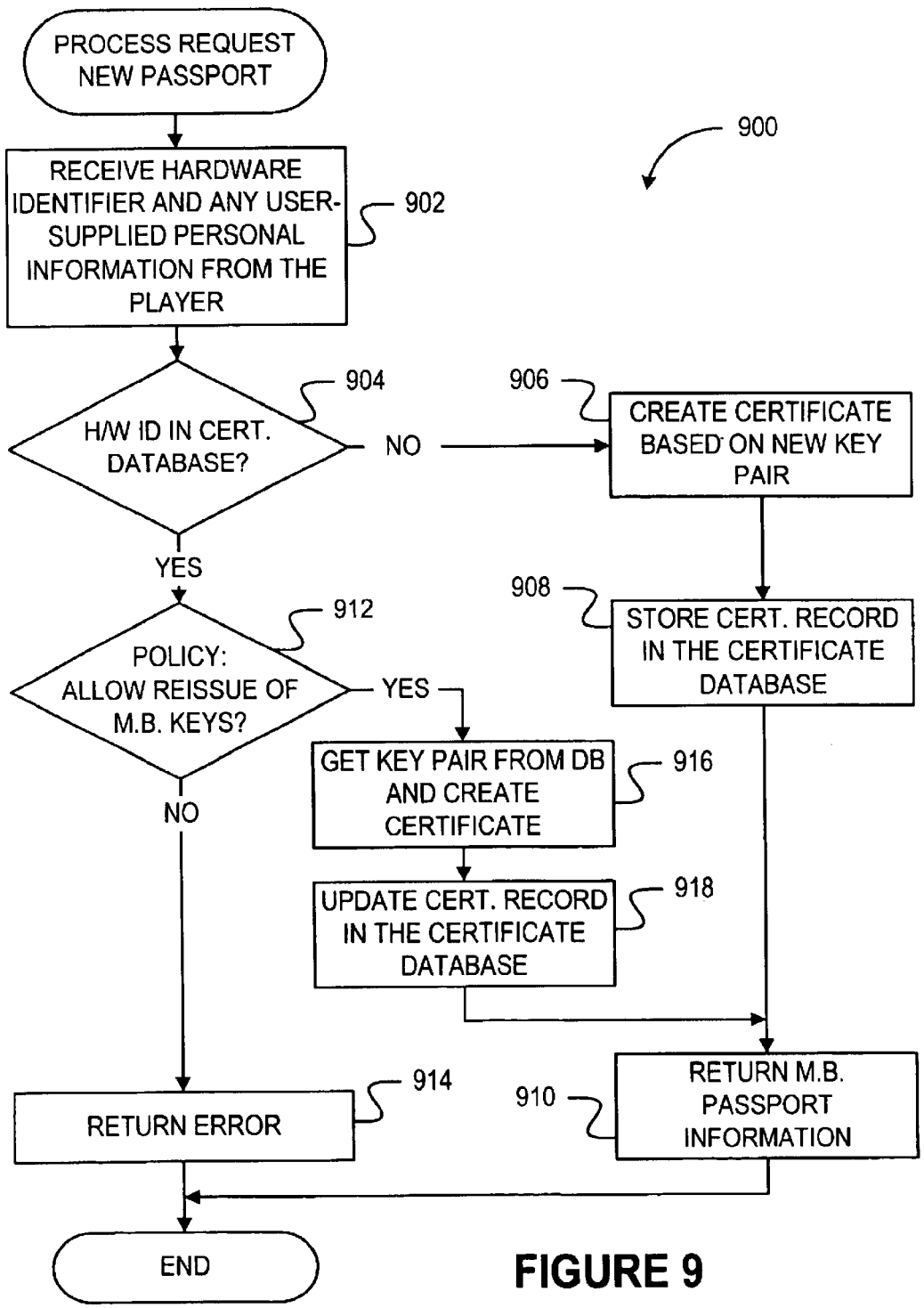
FIG. 9 is a logic flow diagram of the processing by the server process of FIG. 1 of a request for a new machine-bound passport in accordance with the present invention.

19), representing an equivalent hardware identifier within hardware identifier field 1914. If no such key record is found, processing transfers to step 906 (FIG. 9). Conversely, if such a key record is found, processing transfers to test step 912, which is described below.

In step 906, authentication server 126 creates a new private/public key pair and creates a new certificate based on the new key pair, e.g., the key pair of key record 1704 (FIG. 19) and certificate 2100 (FIG. 21), respectively. In step 908 (FIG. 9), authentication server 126 associates the new certificate with the received hardware identifier, e.g., hardware identifier 140, within certificate database 124. Such association is accomplished by storing hardware identifier 140 in hardware identifier field 1914 (FIG. 19) of key record 1704. In step 910 (FIG. 9), authentication server 126 returns to content player 142 a machine-bound passport record. A machine-bound passport record is a collection of data from which content player 142 can construct a machine-bound passport such as passport 148B described above. Such a machine-bound passport record includes, for example, passport information 2204B (FIG. 24) and signature algorithm 2206 and signature 2208. After step 910 (FIG. 9), processing according to logic flow diagram 900 completes.

Returning to test step 904, if a key pair associated with hardware identifier 140 (FIG. 1) is already present within certificate database 124, processing transfers to test step 912 (FIG. 9) in which a policy decision is implemented. The policy determines whether to allow keys associated with existing machine-bound passports to be re-issued. It is possible that a user loses a machine-bound passport, e.g., through inadvertent deletion or through data loss due to a hardware failure. In addition, if re-issue of machine-bound passport keys are allowed, the number of times such re-issue is permitted can be limited. For example, such a limit is specified in reissue limit field 1910 (FIG. 19). In one embodiment, a limit of zero indicates that machine-bound keys cannot be reissued. In this embodiment, reissue limit field 1910 stores data having a value of one to indicate that machine-bound keys can be re-issued only once. If policy determines that these keys shall not be re-issued, e.g., since keys are not re-issued or since certificate database 124 indicates that the maximum permitted number of re-issues have been performed for this machine-bound passport, processing transfers to step 914 (FIG. 9). In step 914, an error is returned rather than a machine-bound passport record. Conversely, if the re-issue is permitted by policy, processing transfers to step 916. Policy can permit such re-issue if re-issue is permitted generally and certificate database 124 indicates that less than the maximum permitted number of re-issues have been performed. In one embodiment, authentication server 126 determines the number of time keys of key record 1704 (FIG. 17) have been re-issued by searching for and counting history records such as history record 1706 within certificate database 124 represent such a re-issue. History record 1706 represents a re-issue of the keys of key record 1704 if serial number 2002 (FIG. 20) corresponds to serial number 1902 (FIG. 19) and activity field 2006 specifies a re-issue event.

In step 916, authentication server 126 retrieves the private/public key pair associated with the received hardware identifier, e.g., the key pair of key record 1704 associated with hardware identifier 140, from certificate database 124 and forms a machine-bound passport record from the reprieved pair in the manner described above. In step 918, authentication server 126 updates certificate database 124 to reflect the additional issuance of the keys associated with the received hardware identifier. In this illustrative embodiment, authentication server 126 records such a re-issue by creating a new history record, e.g, history record 1706, with serial number 2002 (FIG. 20) corresponding to serial number 1902 (FIG. 19) of the key record and activity field 2006 representing a re-issue event. Processing transfers from step 918 to step 910 in which the passport record is returned in the manner described above. After step 910, processing according to logic flow diagram 900 completes.

Logic flow diagram 1000 (FIG. 10) illustrates the processing of passports during access of acquired content. In the context of FIGS. 10–16, specific content of acquired content 144 has been selected by the user for playback and that content is sometimes referred to as the selected acquired content. In test step 1002 (FIG. 10), content player 142 determines whether a full passport is present. If not, processing transfer to test step 1008, which is described more completely below. Conversely, if a full passport is present, processing transfers to step 1004 in which content player 142 authenticates the user through checking a user-supplied password in the manner described above with respect to steps 704 (FIG. 7) and 706. After the user is authenticated, content player 142 attempts, in step 1006 (FIG. 10), to playback the selected content using the full, user-bound passport located in test step 1002.

In test step 1008, content player 142 determines whether a machine-bound passport is present. If not, no passport is present and processing transfers to dialog step 1016. On the other hand, if a machine-bound passport is present, processing transfers to step 1010 in which content player 142 verifies that hardware identifier 140 corresponds to the machine-bound passport in the manner described above with respect to steps 712 (FIG. 7) and 714. If step 1010 produces a verification error, i.e., if hardware identifier 140 does not correspond to the machine-bound passport, processing transfers to dialog step 1016 which is described below. Conversely, if verification is successful, processing transfers to step 1006.

In step 1006, content player 142 attempts to playback the selected content. In test step 1012, content player 142 determines whether attempted playback is successful, i.e., whether the passport key successfully decodes the selected content. Such a determination is made in the manner described above with respect to steps 706 (FIG. 7) and 714.

If the selected passport key successfully decrypts the selected content, processing transfers to step 1014 in which content player 142 continues with playback of the selected content. At step 1014, the user and/or client computer system 104 have been authenticated as entitled to access the selected content.

If, on the other hand, the selected passport key cannot successfully decrypt the selected content, processing transfers to dialog step 1016. Thus, processing transfers to dialog step 1016 if no passport is detected by content player 142 (through test step 1008), if hardware identifier 140 does not correspond to the machine-bound passport located by content player 142 (from step 1010), or if the selected passport key cannot successfully decrypt the selected content (through test step 1012). In dialog step 1016, content player 142 reports to the user that the user is not authorized to play the selected content and asks the user if the user would like to become so authorized.

If the user responds in the negative, processing transfers to step 1020 in which content player 142 returns an error and terminates processing. Conversely, if the user responds in the affirmative, processing transfers to step 1018 in which a new passport is created for the selected content and continues to step 1014 in which content player 142 continues with playback of the selected content.

Figure 10:
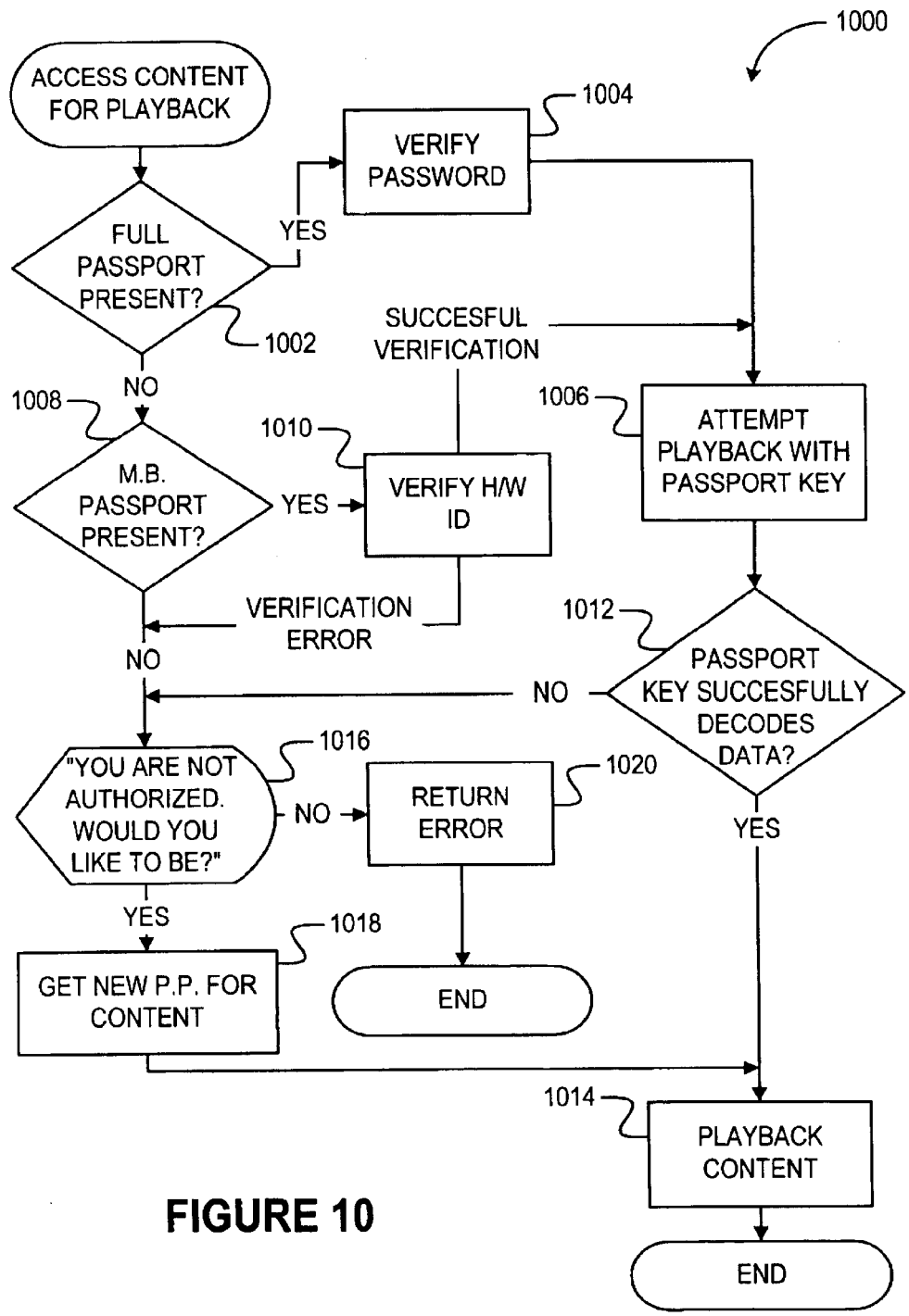
FIG. 10 is a logic flow diagram of the acquisition of a new full passport during user authentication in accordance with the present invention.
Figure 11A:
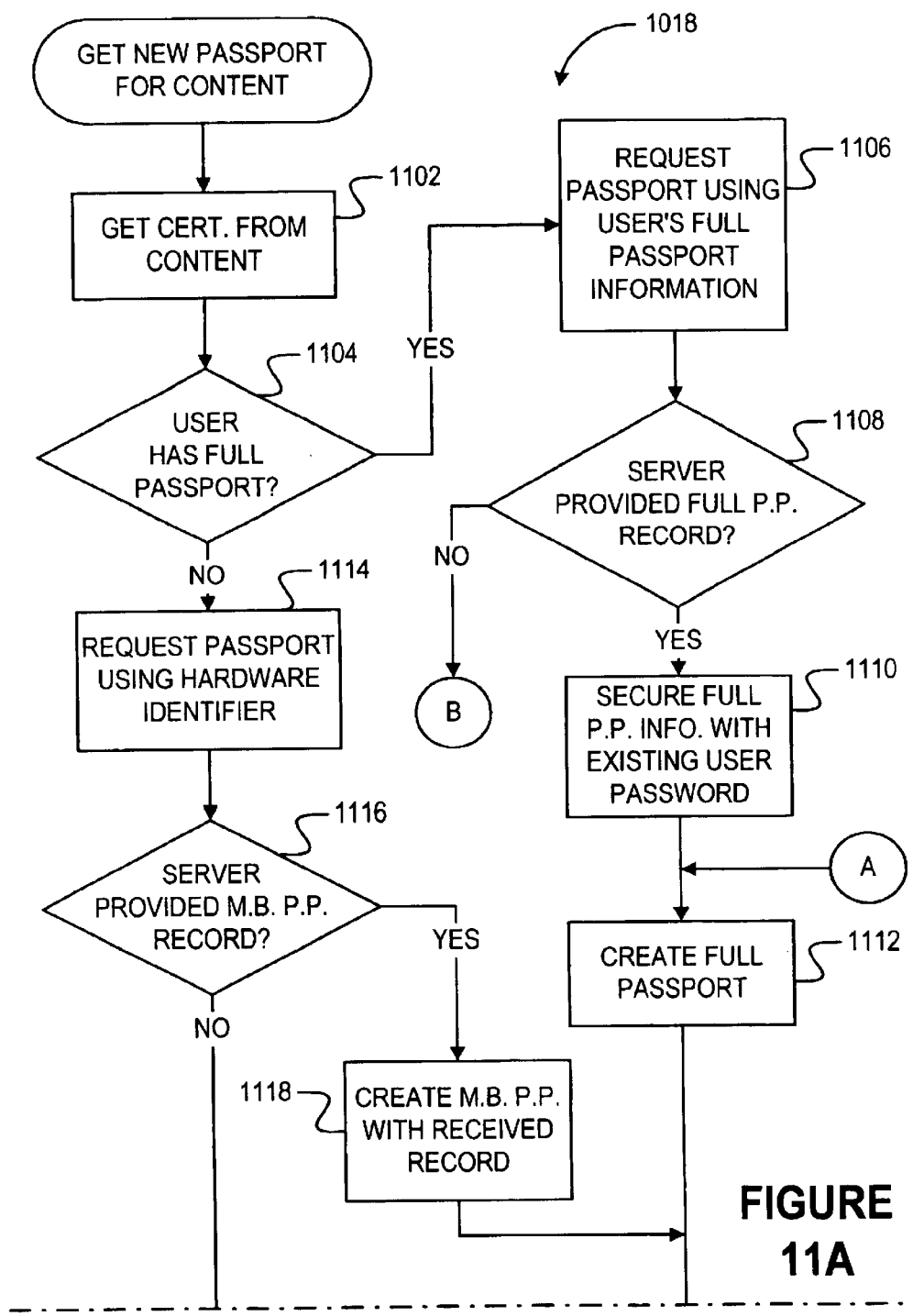
FIG. 11 is a logic flow diagram of the processing by the server process of FIG. 1 of a request for a new full passport in accordance with the present invention.

Step 1018 is shown in greater detail as logic flow diagram 1018 (FIG. 11). In step 1102, content player 142 retrieves a content certificate from the selected content. The content certificate is a digital certificate, e.g., an ITU-T X.509 digital certificate, which is included in the selected content and which identifies who acquired the content originally. Certificate 2100 (FIG. 21) is an illustrative example of such a certificate and is described more completely above. In this illustrative embodiment, content player 142 retrieves the certificate serial number, e.g., certificate serial number 2102, by which authentication server 126 (FIG. 1) can locate certificate 2100 within certificate database 124. In test step 1104 (FIG. 11), content player 142 determines whether the user has a full passport. Content player 142 can make such a determination based upon presence of a full passport as determined in step 1002 (FIG. 10) or upon failure of the user to authenticate any present full passport in step 1004. In addition, the user can be asked for a name and e-mail address and the user's responses thereto can be used to search for account records such as account record 1702 (FIG. 18) having equivalent name field 1804 and e-mail address field 1806. If the user has a full passport, processing transfers to step 1106 (FIG. 11) in which content player 142 requests a passport for the selected acquired content using the user's full passport information, including private user information 2306 (FIG. 23). If the user has no full passport, processing transfers to step 1114 (FIG. 11) in which content player 142 requests a passport for the selected content using hardware identifier 140. In this embodiment, the user is provided with an opportunity to provide some personal information such as a name, e-mail address, and country of residence and that information can accompany hardware identifier 140 in the request for a new passport in step 1114.

Processing by authentication server 126 in response to requests of steps 1106 and 1114 is described below in conjunction with FIGS. 13 and 12, respectively. In response to the request of step 1106 (FIG. 11), authentication server 126 can send a full passport record or an error message. In response to the request of step 1114, authentication server 126 can send a machine-bound passport record or an error message.

In test step 1108, content player 142 determines whether a full passport record is returned by authentication server 126. If not, an error is returned and processing according to logic flow diagrams 1018 and 1000 terminates. Conversely, if a full passport record is returned, processing transfers to step 1110.

In step 1110, content player 142 secures the full passport information of the full passport record with a user-supplied password in the manner described above with respect to full passport generator 504 (FIG. 5).

Processing transfers from step 1110 (FIG. 11) to step 1112 in which content player 142 creates full passport 148A (FIG. 3A) from the full passport information received from authentication server 126.

Processing transfers from step 1114 to test step 1116. In test step 1116, content player 142 determines whether data received from authentication server 126 in response to the request of step 1114 or step 1106 represents a machine-bound passport record. If so, content player 142 creates a machine-bound passport such as passport 148B (FIG. 3B) using the machine-bound passport record and processing according to logic flow diagram 1018, and therefore step 1018 (FIG. 10), completes.

Conversely, if the data returned by authentication server 126 does not represent a machine-bound passport record, processing transfers to test step 1120. In test step 1120, content player 142 determines whether the response by authentication server 126 indicates that the user needs a full passport to be properly authenticated to access the selected acquired content. In not, the user cannot be authenticated to access the acquired content, and content player 126 notes that an error has occurred and reports the error to the user, terminating processing according to logic flow diagram 1018, and therefore step 1018 (FIG. 10). If, on the other hand, the response from authentication server 126 indicates that the user needs a full passport, processing transfers to step 1122.

In step 1122, content player 142 sends to authentication server 126 a request for a new passport. The request includes data specifying hardware identifier 140 and a certificate retrieved from the selected acquired content. The certificate of the acquired content identifies the selected acquired content within certificate database 124 (FIG. 1). Authentication server 126 responds to such a request in the manner described below with respect to logic flow diagram 1400 (FIG. 14), sending to content player 142 either a full passport record or an error message.

In test step 1124, content player 142 determines whether authentication server 126 returns a full passport record or an error. If an error is returned, the user cannot be authenticated to access the acquired content, and content player 126 notes that an error has occurred and reports the error to the user, terminating processing according to logic flow diagram 1018, and therefore step 1018 (FIG. 10). If, on the other hand, the response from authentication server 126 is a full passport record, processing transfers to step 1126 (FIG. 11) in which content player 142 prompts the user to enter a password.

Processing transfers from step 1126 to step 1112 in which content player 142 creates full passport 148A (FIG. 3A) from the full passport information received from authentication server 126. After step 1112 (FIG. 11), whether through step 1110 or step 1126, processing according to logic flow diagram 1018, and therefore step 1018 (FIG. 10), completes.

Figure 12A:
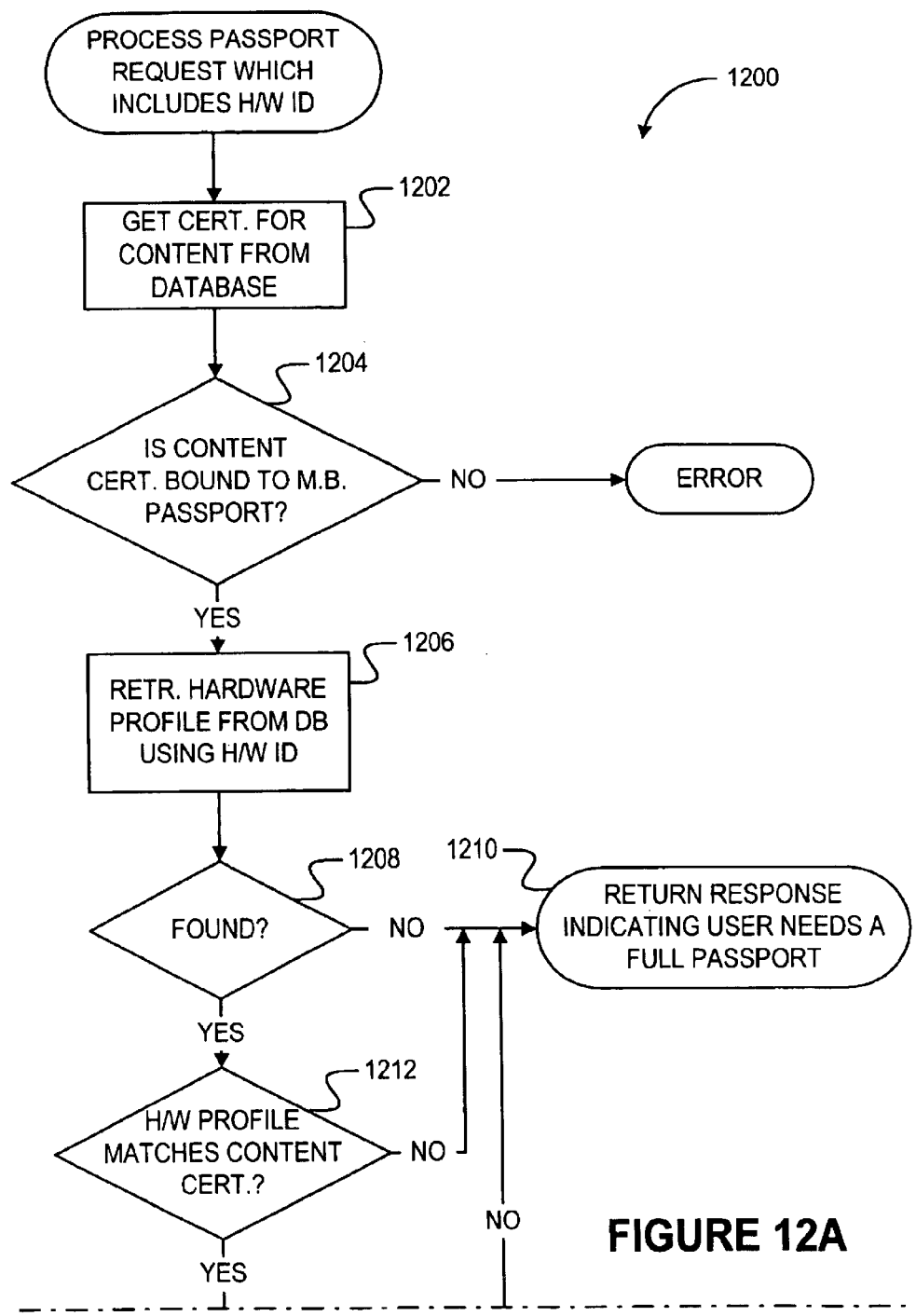
FIG. 12 is a logic flow diagram of the processing by the server process of FIG. 1 of a request for a new full passport in accordance with the present invention.
Figure 12B:
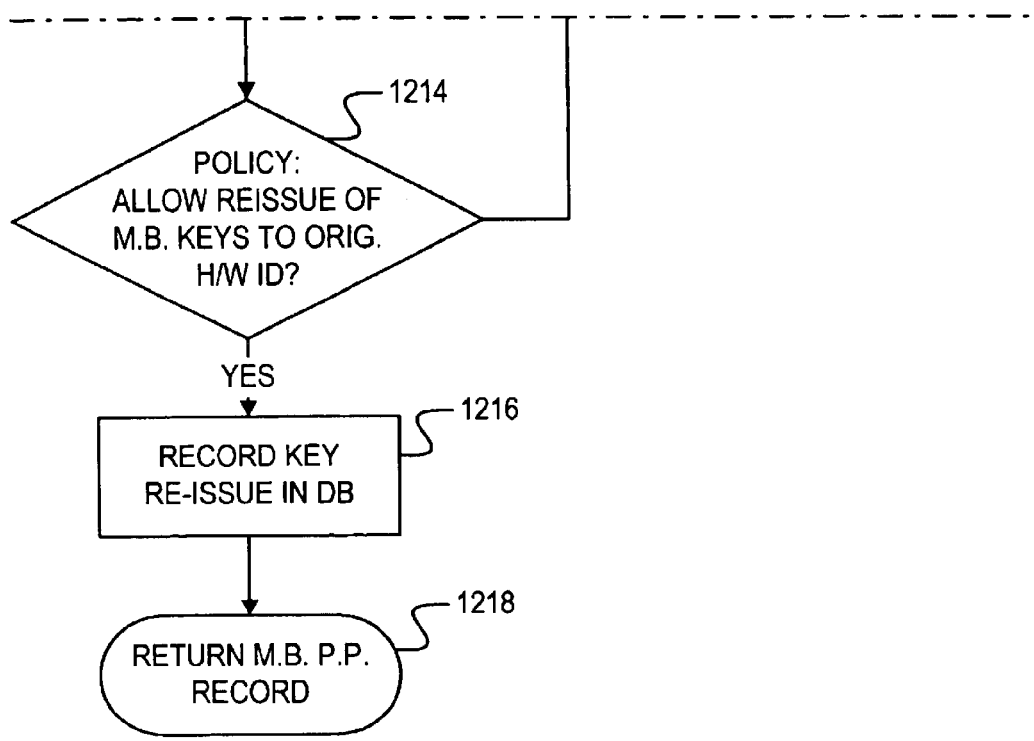
Figure 12:
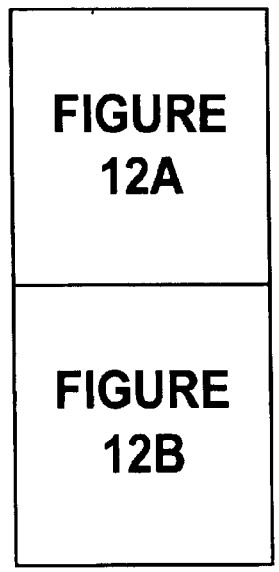
Figure 13:
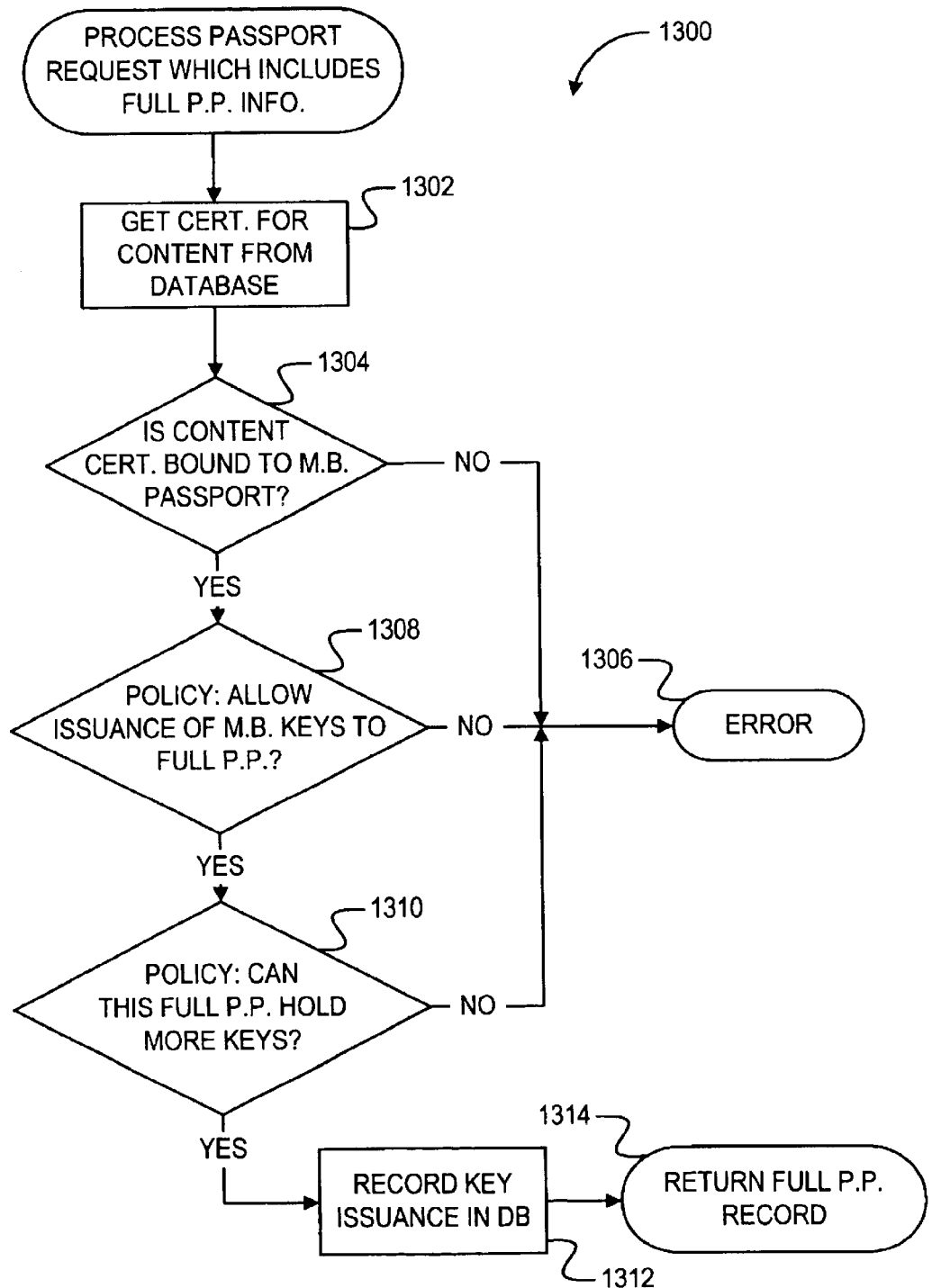
FIG. 13 is a logic flow diagram of the processing by the server process of FIG. 1 of a request for a new full passport in accordance with the present invention.

As described above, authentication server 126 responds to a request for a passport including a hardware identifier in the manner shown as logic flow diagram 1200 (FIG. 12). Specifically, logic flow diagram 1200 represents the response of authentication server 126 to the request made by content player 142 in step 1114 (FIG. 11) in which the user had no full passport. Accordingly, authentication server 126 is asked to re-issue the same machine-bound passport to which the selected content should already be bound. In step 1202 (FIG. 12), authentication server 126 retrieves the certificate for the selected content from certificate database 124. For example, if content player 142 supplies—as the certificate of the selected content—certificate serial number 2102 (FIG. 21), authentication server 126 retrieves certificate 2100 from certificate database 124 (FIG. 17).

In test step 1204 (FIG. 12), authentication server 124 determines whether the acquired content is bound to a machine-bound passport. Authentication server 124 makes such a determination by retrieving an account record, e.g., account record (FIG. 18), which corresponds to the certificate. Authentication server 126 can locate such an account record by searching for account records having corresponding data values for name 1804, e-mail address 1806 and country 1808 or, alternatively, by maintain a table of records correlating certificate serial number such as certificate serial number 2102 (FIG. 21) with serial numbers such as serial number 1802 (FIG. 18). By examining type field 1816 of the retrieved account record and comparing the data stored therein to data representing a machine-bound type. If the data in type field 1816 so indicates, the selected content is bound to a machine-bound passport. Otherwise, the selected content is bound to a full passport.

If the selected content is not bound to a machine bound passport, authentication server 126 returns an error message indicating that a full passport is required to access the selected content and terminates processing according to logic flow diagram 1200. The full passport is required since the selected content is already bound to a full, user-bound passport. Allowing the content to also be bound to a new machine-bound passport would allow content to be played on numerous computer systems other than those used by the original purchasing user and would represent a compromise of security.

Conversely, if the selected acquired content is bound to a machine-bound passport, processing transfers to step 1206 in which authentication server 126 retrieves a key record representing the computer system associated with the hardware identifier received in the request from content player 142. Specifically, authentication server 126 retrieves the key record, e.g., key record 1704 (FIG. 19), whose hardware identifier record 1914 represents the hardware identifier received from content player 142.

If no such key record is found, processing transfers through test step 1208 (FIG. 12) to terminal step 1210. In terminal step 1210, authentication server 126 returns an error message which indicates that the user needs a full passport to access the selected content. The user needs a full passport since the hardware identifier received from content player 142 is determined in test step 1208 to represent a computer system with which authentication server 126 is not familiar.

If authentication server 126 finds the key record but the key record is not the same as key record retrieved in test step 1204, processing passes through test step 1208 and test step 1212 to terminal step 1210. The user needs a full passport since the request for a machine-bound passport appears to be coming from a computer system other than the one to which the acquired content was original bound.

If the key record is found as determined in test step 1208 and is the same as the key record associated with the selected acquired content as determined in test step 1212, processing transfers to test step 1214 in which authentication server. 126 implements a policy decision. In particular, authentication server 126 determines whether machine-bound keys can be reissued. In this illustrative embodiment, authentication server 126 makes such a determination according to data stored in reissue limit field 1910 (FIG. 19) of the key record retrieved in step 1206 (FIG. 12). If reissue is not permitted, processing transfers to terminal step 1210 in which authentication server 126 returns an error message which indicates that the user needs a full passport to access the selected content. Conversely, if reissue of machine-bound keys is permitted, processing transfers to step 1216.

In step 1216, authentication server 126 records the re-issuance of key record 1704 (FIG. 19) in certificate database 124 (FIG. 17) with a new history record such as history record 1706. After step 1216 (FIG. 12), authentication server 126 returns a machine-bound passport record containing information from key record 1704 (FIG. 19) to content player 142 (FIG. 1) in terminal step 1218 (FIG. 12).

After either terminal step 1210 or terminal step 1218, processing according to logic flow diagram 1200 completes.

As described above, logic flow diagram 1300 (FIG. 13) represents processing by authentication server 126 in response to a request for a new passport which includes full passport information. In particular, logic flow diagram 1300 represents the response by authentication server 126 to the request made by content player 142 in step 1106 (FIG. 11) in which the user already has a full passport and is, in essence, asking to have machine-bound keys added to the full passport. In step 1302 (FIG. 13), authentication server 126 retrieves a certificate for the selected content in the manner described above with respect to step 1202 (FIG. 12). In test step 1304 (FIG. 13), authentication server 126 determines whether the content certificate is machine-bound in the manner described above with respect to step 1204 (FIG. 12).

If the content certificate is not machine bound, authentication server 126 returns an error in terminal step 1306 (FIG. 13) since the selected content is bound to a different full, user-bound passport, i.e., is bound to a different user. Conversely, if the certificate is machine-bound, processing transfers to step 1308.

Test step 1308 implements a policy decision in which authentication server 126 determines whether machine-bound keys can be added to a pre-existing full passport. Such would happen if, for example, a user had registered for a full passport on one client computer system and registered for a machine-bound passport on another client computer system and later wanted to move acquired content from the latter client computer system to the former. The user would have acquired content bound to two different sets of keys. If this is not allowed, processing transfers to terminal step 1306 and returns an error. Conversely, if such is allowed, processing transfers to test step 1310.

In test step 1310, authentication server 126 implements another policy decision, namely, can this particular full passport contain more keys. Typically, full passports are permitted to hold only a limited number of additional keys such that users cannot collect machine-bound keys and content from friends and colleagues without limitation. In this embodiment, passport key limit 1912 (FIG. 19) specifies a maximum number of keys held by a passport based upon key record 1704. Authentication server 126 compares the number of keys already help in the full passport of the user to the limit specified in passport key limit 1912 to determine whether the passport can include more keys.

If the passport cannot include more keys, processing transfers to terminal step 1306 (FIG. 13) in which an error is returned. In terminal step 1306, whether from test step 1304, test step 1308, or test step 1310, processing according to logic flow diagram 1300 terminates.

Conversely, if the passport can include more keys, processing transfers to step 1312 in which the key is added to the passport and the addition of the key is recorded in a new history record in certificate database 124. In adding the key, authentication server 126 adds an addition key record 2312 (FIG. 23) to the passport. Additional key record 2312 includes a key 2314 and a certificate 2316. Certificate 2316 is the certificate of the content player to which the selected content is already bound and key 2314 is the reciprocal private key. Key 2314 is encrypted using the unencrypted registration key 2310—see, e.g., clear registration key 520 (FIG. 5). In one embodiment, such encrypting is performed by content player 142 (FIG. 1) after return of the passport information by authentication server 126 since content player 142 directly receives the user-supplied password. In an alternative embodiment, authentication server 126 maintains clear registration key 520 and receives the user-supplied password from content player 142 along with the passport request and, accordingly, authentication server 126 encrypts key 2314 (FIG. 23).

After step 1314 (FIG. 12), processing transfers to terminal step 1316 in which authentication server sends a full passport record and completes processing according to logic flow diagram 1300.

Figure 14:
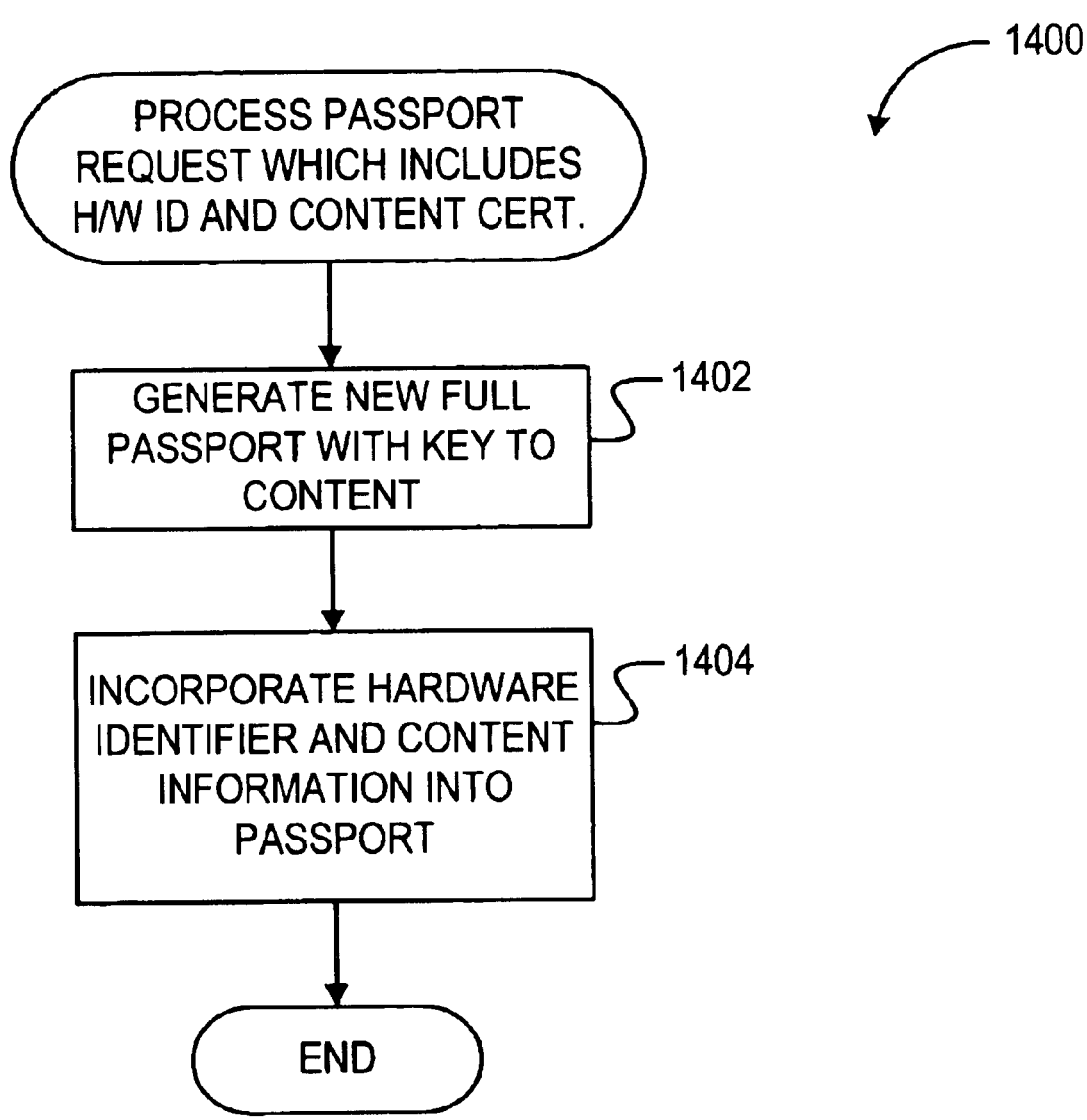
FIG. 14 is a logic flow diagram of the processing by the server process of FIG. 1 of a request for a new full passport in accordance with the present invention.
Figure 15:
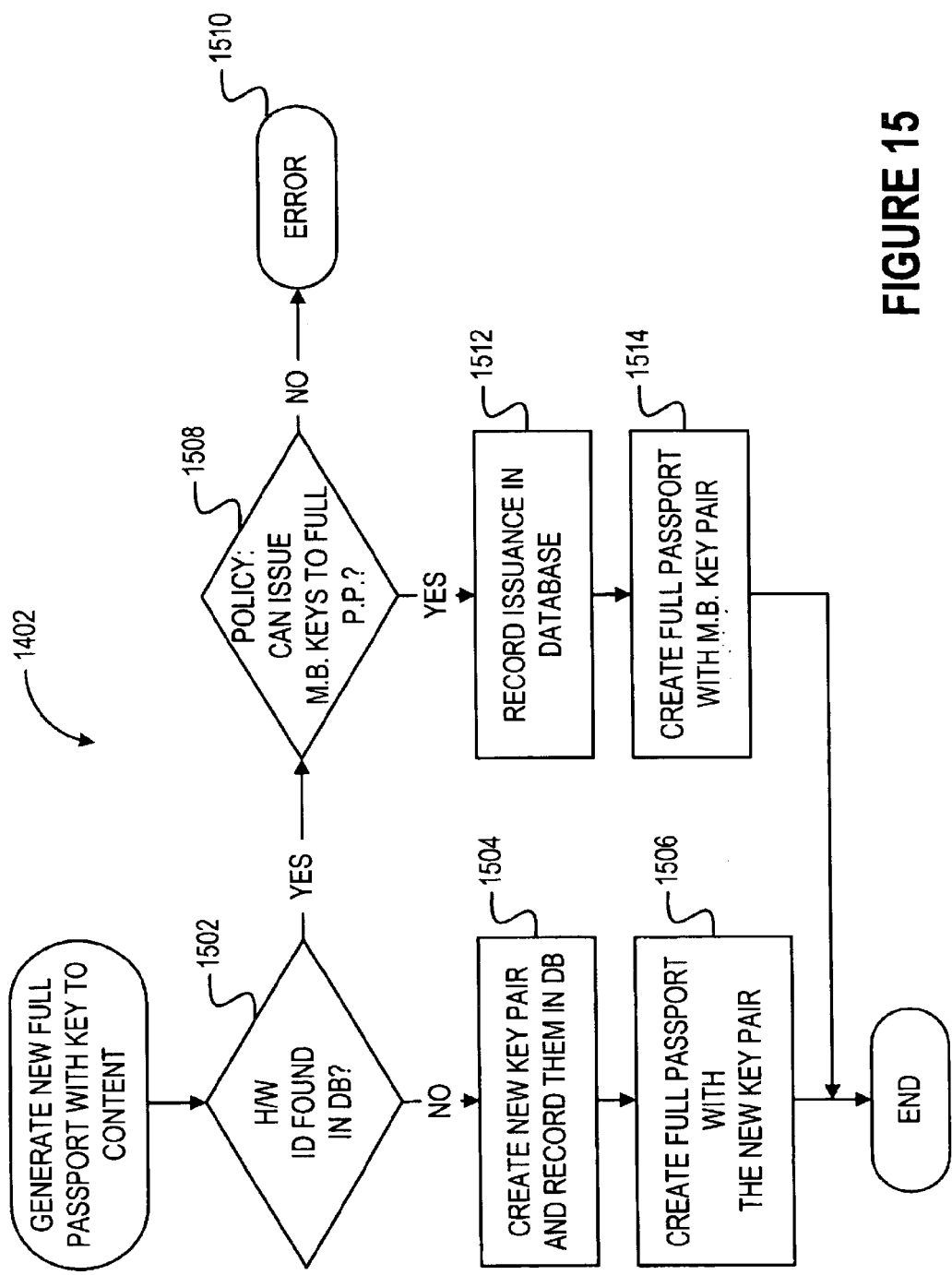
FIG. 15 is a logic flow diagram of the processing of a step of the logic flow diagram of FIG. 14 in greater detail.

Logic flow diagram 1400 (FIG. 14) represents the response by authentication server 126 to the request of content player 142 in step 1122 (FIG. 11) in which the user has no full passport but is requesting that a previously acquired machine-bound passport be upgraded to a full passport. The user can explicitly request such an upgrade or such an upgrade can be attempted when a user agrees after attempting to play machine-bound content on a client computer system to which the content was not bound. In step 1402 (FIG. 14), authentication server 126 generates a new full passport with a key to the content. Step 1402 is shown in greater detail as logic flow diagram 1402 (FIG. 15).

In step 1502, authentication server 126 searches for a key record with a hardware identifier 1914 (FIG. 19) corresponding to the hardware identifier received from content player 142 in the request of step 1122 (FIG. 11). If none is found, processing transfers to step 1504.

In step 1504, authentication server 126 creates a new key pair and forms a new key record, such as key record 1704 (FIG. 19) representing the new key pair. In step 1506, authentication server 126 creates a full passport with the keys of the new key record. Specifically, authentication server 126 copies public key 1906 (FIG. 19) and validity dates 1908 of the newly created key record 1704 to public key 2320 (FIG. 23) and validity dates 2322, respectively. Authentication server 126 creates a new certificate serial number 2324 and signs certificate 2302 to form signature 2326. Authentication server 126 copies private key 1904 (FIG. 19) to private key 2304 (FIG. 23). In this embodiment, private key 2304 is secured by content player 142 (FIG. 1) in step 1010 (FIG. 10) as described above. In addition, private user information 2306 (FIG. 23) is left empty .to be completed by content player 142. Authentication server 126 creates a new registration key 2308 and a new random number 2310. Content player 142 secures registration key 2308 in step 1010 (FIG. 10) as described above.

Returning to test step 1502, if a key record corresponding to the received hardware identifier is found, processing transfers to test step 1508 which implement a policy decision. Specifically, test step 1508 implements the same policy decision implemented by test step 1308 (FIG. 13)—i.e., whether a full passport can include machine-bound keys. In authentication server 126 determines that a full passport cannot include machine-bound keys, processing transfers to terminal step 1510 in which authentication server 126 returns an error and competes processing according to logic flow diagrams 1402 and 1400 (FIG. 14). Conversely, if the full passport can include machine-bound keys, processing transfers to step 1512 (FIG. 15).

In step 1512, authentication server 126 records issuance of the keys of the key record located in test step 1502 in a new history record within certificate database 124. In step 1514, authentication server 126 creates a full passport with the keys of the machine-bound key record. Step 1514 is analogous to step 1506 described above except that key record 1704 is not newly created in step 1514. Instead, key record 1704 is the key record located in test step 1502.

Figure 16A:
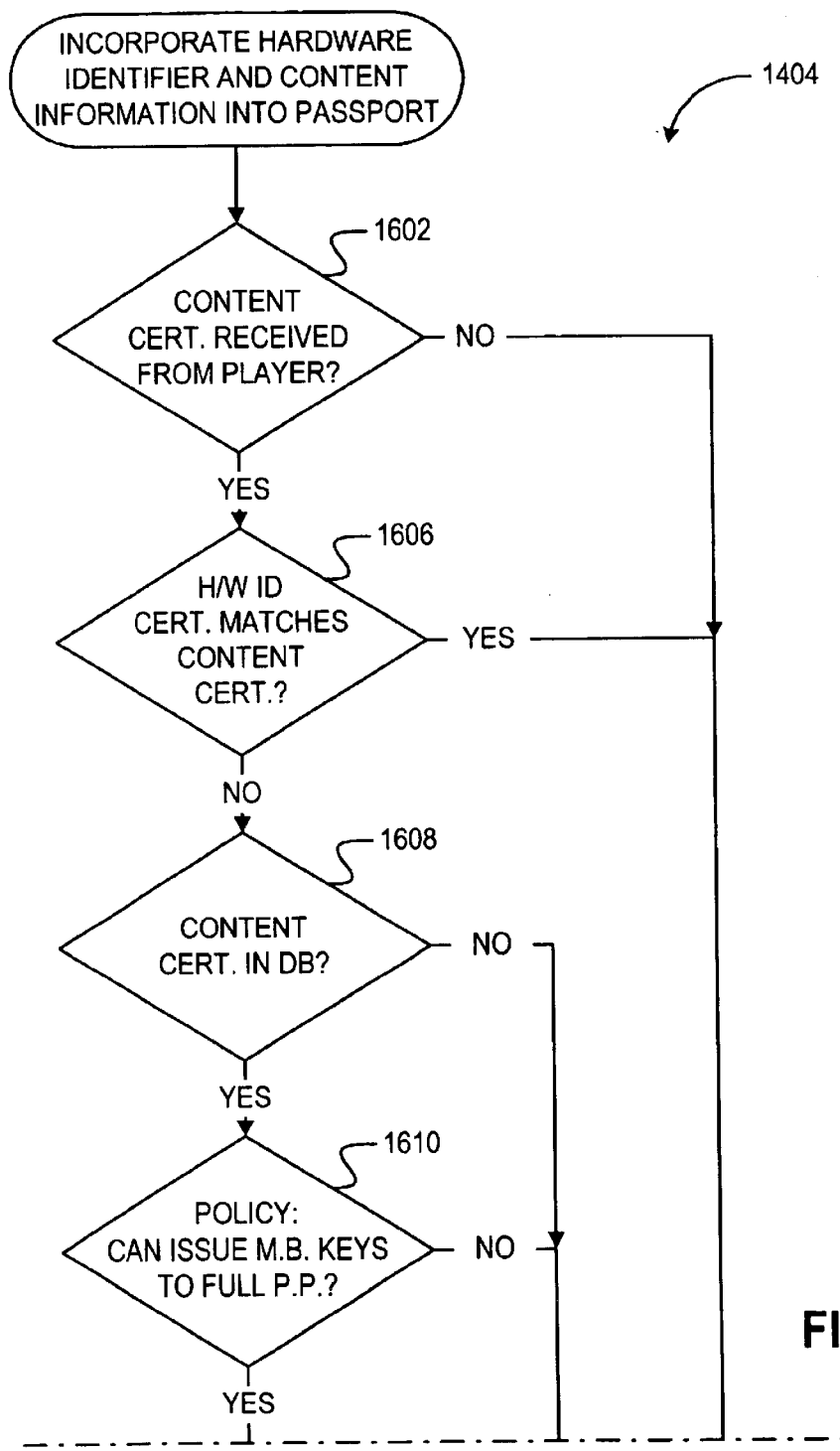
FIG. 16 is a logic flow diagram of the processing of a step of the logic flow diagram of FIG. 14 in greater detail.

After either step 1506 or step 1514, processing according to logic flow diagram 1402, and therefore step 1402 (FIG. 14), completes. In step 1404, authentication server 126 uses the received hardware identifier and content information to generate the new full passport. Step 1404 is shown in greater detail as logic flow diagram 1404 (FIG. 16).

In test step 1602, authentication server 126 determines whether a certificate for selected content is received from content player 142 along with the request of step 1122. If the user explicitly requests upgrade of her passport to user-bound from machine-bound without requesting playback of any particular content, the request-received by authentication server 126 would not include a content certificate. However, if the request comes through step 1122 (FIG. 11) in which the upgrade request is in response to an attempt to play content on a first client computer system when the content is bound to a second client computer system, the request includes the certificate of the content attempted to be played.

If no content certificate is included in the request from content player 142, processing transfers to step 1604 (FIG. 16) in which the full passport information created in step 1506 (FIG. 15) or step 1514 is returned. Processing according to logic flow diagram 1402 (FIG. 16), and therefore step 1404 (FIG. 14), completes after step 1604 (FIG. 16).

If, on the other hand, a content certificate is included in the request from content player 142, processing transfers to test step 1606. In test step 1606, authentication server 126 determines whether the hardware identifier received from content player 142 matches the content certificate. If so, the user is requesting an upgrade from the machine to which her content is bound and processing transfers to step 1604 in which the full passport information created in step 1506 (FIG. 15) or step 1514 is returned. Conversely, if the received hardware identifier and content certificate do not match, processing transfers to test step 1610.

In test step 1610, authentication server 126 implements a policy decision, namely, can machine-bound keys be issued to a full passport. This is the same as the policy decision of test step 1508. If machine-bound keys cannot be issued to a full passport, an error is returned and processing according to logic flow diagrams 1404 and 1400 (FIG. 14) terminates. Conversely, if machine-bound keys can be added to the full passport, processing transfers to test step 1612.

In test step 1612, authentication server 126 implements another policy decision, namely, can this passport hold more keys. This is the same as the policy decision of test step 1310. If the full passport cannot hold more keys, an error is returned and processing according to logic flow diagrams 1404 and 1400 (FIG. 14) terminates. Conversely, if the full passport can hold more keys, processing transfers to step 1614 (FIG. 16).

In step 1614, authentication server 126 records the inclusion of the machine-bound keys into the full passport in certificate database 124 in the manner described above in step 1312 (FIG. 13). In step 1616, authentication server 126 adds the keys form the content certificate into the full passport. For example, if certificate 2100 (FIG. 21) represents the content certificate, authentication server 126 stores certificate 2100 as certificate 2316 (FIG. 23) and stores the associated private key 1904 of the associated key record as key 2314 (FIG. 23).

After step 1614 (FIG. 16), processing transfers to step 1604 in which the fall passport information created in step 1506 (FIG. 15) or step 1514 with the additional keys of step 1616 (FIG. 16) is returned and processing according to logic flow diagrams 1404 and 1400 (FIG. 14) complete.

Thus, a machine-bound passport is converted to a user-bound passport in a secure manner that is relatively convenient for the user and without requiring re-encrypting or otherwise modifying the bound data.

Secure Connection Between the Authentication Server and the Content Player

As described briefly above, authentication server 126 (FIG. 1) and content player 142 communicate through a secure connection through wide-area network 106. In one embodiment, the known Secure Sockets Layer (SSL) type of connection is used for secure communication between authentication server 126 and content player 142.

In an alternative embodiment, authentication server 126 and content player 142 communicate with one another in a cryptographically secure session that is simpler than the SSL protocol. Content player 142 sends a request message to authentication server 126 to obtain the certificate of authentication server 126. Content player 142 encrypts its registration information using the public key of authentication server 126 so that only authentication server 126 can decrypt the registration information. Authentication server 126 returns information necessary to create the passport to content player 142. The information is encrypted using a key derived from the registration information provided by content player 142 such that only content player 142 can decrypt the passport information.

The above description is illustrative only and is not limiting. The present invention is limited only by the claims which follow.

What is claimed is:

1. A method for converting content data from machine-bound to user-bound, the method comprising:
   (i) binding the content data to one or more hardware devices using one or more binding keys which are related to the one or more hardware devices;
   (ii) converting the one or more binding keys to form one or more cleartext keys such that the one or more cleartext keys are independent of the one or more hardware devices; and
   (iii) binding the one or more cleartext keys to a user to form one or more user-bound keys.

2. The method of claim 1 wherein (iii) binding comprises:
   requiring that the user enters a password prior to allowing use of the user-bound keys to access the content data.

3. The method of claim 2 wherein (iii) binding further comprises:
   encrypting the one or more cleartext keys using the password as an encryption key.

4. The method of claim 1 wherein (iii) binding comprises:
   encrypting the one or more cleartext keys to form the user-bound keys in a manner which requires that the user provide a decryption key to decrypt the cleartext keys from the user-bound keys to thereby provide access to the content data.

5. The method of claim 1 wherein (iii) binding comprises:
   associating private information of the user with the content data such that playback of the content data causes display of the private user information.

6. The method of claim 1 wherein (i) binding comprises:
   encrypting the one or more cleartext keys using hardware identification data as an encryption key to form the one or more binding keys wherein the hardware identification data corresponds to the one or more hardware devices.

7. The method of claim 6 wherein (ii) converting comprises:
   decrypting the one or more binding keys using the hardware identification data as the encryption key to form the one or more cleartext keys.

8. The method of claim 1 further comprising:
   determining that a pre-existing data structure binds the user to other content;
   wherein (iii) binding includes:
      including the user-bound keys as one or more additional keys to the data structure.

9. The method of claim 1 wherein (ii) converting and (iii) binding are performed in response to detection of a condition in which the user requests playback of the content data in a system which does not include the one or more hardware devices.

* * * * *